(12) United States Patent
Powers et al.

(10) Patent No.: US 12,545,350 B2
(45) Date of Patent: Feb. 10, 2026

(54) SYSTEM, METHOD AND APPARATUS FOR SWITCHABLE SOUND-MAKING DEVICE

(71) Applicant: POWERS INNOVATION, LLC, Lafayette, CO (US)

(72) Inventors: Philip Powers, Lafayette, CO (US); Mathew Heidmous, Lafayette, CO (US)

(73) Assignee: POWERS INNOVATION, LLC, Lafayette, CO (US)

( * ) Notice: Subject to any disclaimer, the term of this patent is extended or adjusted under 35 U.S.C. 154(b) by 1154 days.

(21) Appl. No.: 17/502,641

(22) Filed: Oct. 15, 2021

(65) Prior Publication Data

US 2022/0119067 A1    Apr. 21, 2022

Related U.S. Application Data

(60) Provisional application No. 63/093,584, filed on Oct. 19, 2020.

(51) Int. Cl.
*B62J 45/10* (2020.01)
*B62J 45/41* (2020.01)
*G06F 3/16* (2006.01)
*G08B 21/02* (2006.01)

(52) U.S. Cl.
CPC ............ *B62J 45/10* (2020.02); *B62J 45/41* (2020.02); *G06F 3/16* (2013.01); *G08B 21/02* (2013.01)

(58) Field of Classification Search
None
See application file for complete search history.

(56) References Cited

U.S. PATENT DOCUMENTS

| | | | | |
|---|---|---|---|---|
| 4,908,000 A * | 3/1990 | Counts | ............... | A63H 33/40 446/236 |
| 5,278,537 A * | 1/1994 | Carlo | ............... | A01M 29/18 340/384.1 |
| 5,515,026 A * | 5/1996 | Ewert | ............... | B60Q 1/525 340/384.1 |
| 6,023,225 A * | 2/2000 | Boley | ............... | G08B 13/2454 206/315.6 |
| 6,234,864 B1 * | 5/2001 | Onori | ............... | B62J 3/06 446/404 |
| 7,042,340 B2 * | 5/2006 | Ewert | ............... | B60Q 5/00 340/384.1 |
| 8,737,169 B1 * | 5/2014 | DeWitt | ............... | A01M 29/18 367/139 |
| 9,236,040 B2 | 1/2016 | Nadolny | | |
| 9,240,175 B1 | 1/2016 | Wyche | | |

(Continued)

FOREIGN PATENT DOCUMENTS

CN     1275669 C     9/2006
CN     204452687 U   7/2015

(Continued)

*Primary Examiner* — Muhammad Adnan
(74) *Attorney, Agent, or Firm* — Dickinson Wright PLLC

(57) ABSTRACT

A sound emitting device can include electrically powered components that emit sound. In addition, the device can have a sensor capable of detecting movement of the device, and an electrically powered circuit. When the sensor is activated, the circuit can send a signal to the device to cause the device to emit sound. An attachment device can couple the device to a person, animal, bicycle, other device or a combination thereof.

18 Claims, 27 Drawing Sheets

(56) References Cited

U.S. PATENT DOCUMENTS

| | | | |
|---|---|---|---|
| 9,633,643 B1* | 4/2017 | Bilanenko | B62J 3/04 |
| 9,734,813 B2 | 8/2017 | Lacy | |
| 10,126,998 B2 | 11/2018 | Yuen et al. | |
| 10,246,156 B2* | 4/2019 | Snaith | G08B 3/10 |
| 10,544,608 B2* | 1/2020 | Stoia | E05B 81/80 |
| D878,948 S * | 3/2020 | Ke | D10/118 |
| 10,928,052 B2* | 2/2021 | Ayala | A41D 20/00 |
| 12,162,551 B1* | 12/2024 | Jackson | B62H 5/20 |
| 2006/0096519 A1* | 5/2006 | Drake | A01M 29/10 116/22 A |
| 2008/0024289 A1* | 1/2008 | Pino | B60Q 5/00 340/463 |
| 2014/0118128 A1* | 5/2014 | Orzeck | B62J 6/16 340/432 |
| 2015/0087332 A1* | 3/2015 | Pijl | G01S 5/019 455/456.1 |
| 2017/0192124 A1* | 7/2017 | Kolar | G01V 9/005 |
| 2018/0051870 A1* | 2/2018 | Ayala | F21V 23/0471 |
| 2018/0290590 A1* | 10/2018 | Goldman-Shenhar | B60Q 9/008 |
| 2018/0308333 A1* | 10/2018 | Brady | A63B 71/0622 |
| 2019/0149725 A1* | 5/2019 | Adato | H04N 1/00 348/158 |
| 2020/0207435 A1* | 7/2020 | Salvioli Mariani | B62J 6/16 |
| 2021/0129932 A1* | 5/2021 | Keller | B60Q 1/2615 |
| 2022/0051542 A1* | 2/2022 | Alvarez | G08B 21/0283 |

FOREIGN PATENT DOCUMENTS

| | | |
|---|---|---|
| EP | 0008841 A1 | 3/1980 |
| GB | 2546611 A | 7/2017 |
| WO | 2012100289 A1 | 8/2012 |

* cited by examiner

SYSTEM, METHOD AND APPARATUS FOR SWITCHABLE SOUND-MAKING DEVICE

CROSS-REFERENCE TO RELATED APPLICATION

This application claims priority to U.S. Prov. Patent Application No. 63/093,584, filed Oct. 19, 2020, which is incorporated herein by reference in its entirety for all purposes.

TECHNICAL FIELD

This disclosure relates generally to outdoor recreation. In particular, the following description relates to trail safety during outdoor recreation through audible signaling.

BACKGROUND

Cyclists are capable of moving much more quickly than pedestrians and, as they are often rather quiet, have a tendency to startle pedestrians when they suddenly come upon them, or, in a worst case scenario, even collide with them. This is fairly common on tight (single track) trails in the woods. The same issue can occur when a cyclist happens upon a bear, moose, or other wildlife when in the woods. It can also occur between a slow moving and fast moving cyclist, or between cyclists headed in opposing directions.

Similarly, hikers or backpackers can easily startle wildlife if the wildlife sees them nearby before they are heard. This has resulted in wildlife charging or attacking humans in the backcountry.

When hiking with their pets, many pet owners attach mechanical bells or other noise making devices to their pets to hear where they are located, to alert other trail users to the pet, and to alert wildlife. Some parents will do the same with their children when hiking. Thus, improvements in alerting systems for outdoor recreation continue to be of interest.

SUMMARY

An electronic motion activated sound device is a small sound emitting device intended to be used during an activity where the user is in motion. The sound emitting device has utility and the ability to enable or disable it has utility. The motion activated sound device is capable of emitting sound loud enough that individuals or wildlife in the vicinity are aware of the general location it is being emitted from. Sound emission can be dependent on movement of the object to which the device is coupled.

Embodiments of a switchable mechanical motion activated sound device include a sound emitting device that can be used during an activity where the user is in motion and a sound emitting device would have utility, and where the ability to enable, dampen or disable the sound has utility. The switchable mechanical motion activated sound device is capable of emitting sound loud enough that individuals in the vicinity are aware of the general location it is being emitted from. Sound formation can be dependent on movement of the object to which the device is coupled.

Some applicable activities include, but are not limited to, biking, hiking, walking, running, skiing, roller-blading, snowshoeing, etc. There exist a plurality of options for coupling the motion activated sound device to a person, animal, object, or some combination thereof during an activity. Some locations can include on the user, on an accessory the user is wearing, or on the mode of transportation the user is operating.

A motion activated sound device can be fastened to a wheeled transportation device similar or related to a unicycle, bicycle, or tricycle on areas such as the handlebars, seat post, or frame components. The motion of the transportation device can be utilized by the motion activated sound device to both effect and affect the emission of sound. Additionally, the switchable mechanical motion activated sound device can have different states of functionality where more, or less, sound is emitted; these states are referred to herein as "on state" and "off state" respectively. Sound emitted is most clamorous in the on state, and least clamorous in the off state.

A dampened state wherein sound emitted from the device is lower in volume, cadence and/or other characteristics when compared to the on state, but not eliminated as in the off state, can be achieved by setting the device to varying degrees between the on and off states. The closer the device is set to the on state, the more clamorous the sound. Conversely, the closer the device is set to the off state, the less clamorous the sound.

A motion activated sound device can be coupled directly to the user in a wide variety of use cases including those listed previously. Common areas a user can fasten the device to their body include arms, legs, and neck. Through the use of an adjustable fastening device such as an elastic band or cinching band, the motion activated sound device can be mounted to any point on the user's body that the user sees fit.

A motion activated sound device can be fastened to an article of clothing or an accessory piece of equipment on the user's body. During activities such as hiking, a user is likely to be wearing or carrying pieces of equipment such as jackets, backpacks, hiking poles or other gear. Fastening the device to an article of clothing or accessory equipment can allow the user versatility for where they can mount the device.

These and other embodiments are discussed below with reference to the drawings. However, those skilled in the art will readily appreciate that the detailed description given herein with respect to these drawings is for explanatory purposes only and should not be construed as limiting.

BRIEF DESCRIPTION OF THE DRAWINGS

For a more complete understanding of this disclosure and its advantages, reference is now made to the following description, taken in conjunction with the accompanying drawings.

Figure 1:
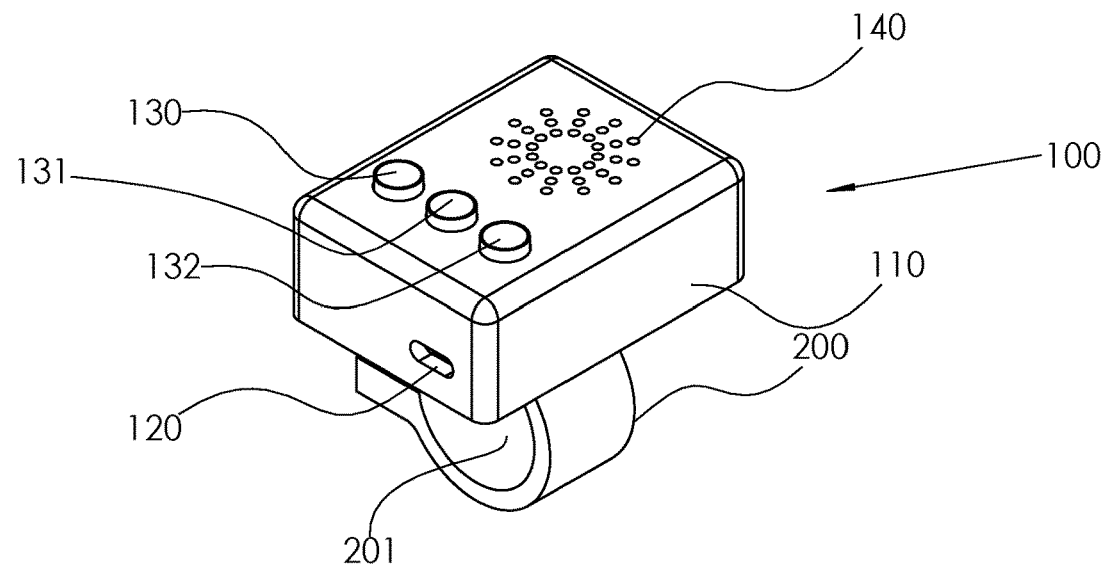
FIG. 1 illustrates a top perspective view of an embodiment of the electronic motion activated sound device showing a coupling device for mounting to a tubular object, in accordance with some embodiments.

Those skilled in the art will appreciate and understand that, according to common practice, various features of the drawings discussed are not necessarily drawn to scale, and that dimensions of various features and elements of the drawings can be expanded or reduced to more clearly illustrate the embodiments described herein.

DETAILED DESCRIPTION

FIGS. 1-48, discussed below, and the various embodiments used to describe the principles of this disclosure are by way of illustration only and should not be construed in any way to limit the scope of the disclosure.

Consistent with the above disclosure, the examples of systems and method enumerated in the following clauses are specifically contemplated and are intended as a non-limiting set of examples. Various terms are used to refer to particular system components. Different entities may refer to a component by different names—this document does not intend to distinguish between components that differ in name but not function. In the following discussion and in the claims, the terms "including" and "comprising" are used in an open-ended fashion, and thus should be interpreted to mean "including, but not limited to . . . " Also, the term "couple" or "couples" is intended to mean either an indirect or direct connection. Thus, if a first device couples to a second device, that connection may be through a direct connection or through an indirect connection via other devices and connections.

The terminology used herein is for the purpose of describing particular example embodiments only, and is not intended to be limiting. As used herein, the singular forms "a," "an," and "the" may be intended to include the plural forms as well, unless the context clearly indicates otherwise. The method steps, processes, and operations described herein are not to be construed as necessarily requiring their performance in the particular order discussed or illustrated, unless specifically identified as an order of performance. It is also to be understood that additional or alternative steps may be employed.

The terms first, second, third, etc. may be used herein to describe various elements, components, regions, layers and/or sections; however, these elements, components, regions, layers and/or sections should not be limited by these terms. These terms may be only used to distinguish one element, component, region, layer or section from another region, layer or section. Terms such as "first," "second," and other numerical terms, when used herein, do not imply a sequence or order unless clearly indicated by the context. Thus, a first element, component, region, layer or section discussed below could be termed a second element, component, region, layer or section without departing from the teachings of the example embodiments. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C. In another example, the phrase "one or more" when used with a list of items means there may be one item or any suitable number of items exceeding one.

Spatially relative terms, such as "inner," "outer," "beneath," "below," "lower," "above," "upper," "top," "bottom," and the like, may be used herein. These spatially relative terms can be used for ease of description to describe one element or feature's relationship to another element(s) or feature(s) as illustrated in the figures. The spatially relative terms may also be intended to encompass different orientations of the device in use, or operation, in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

Many cities and municipalities provide dedicated pedestrian throughways that are used by people for walking, jogging, bicycling, rollerblading/skating, or any other means of conveyance, for both recreational and practical transportation purposes. It is also common to see such pedestrian traffic on city streets, sidewalks, side roads or even open country highways. Furthermore, many other private and public access wilderness or park areas provide trails that are used for similar activities such as mountain biking, hiking or cross-country skiing. As both a courtesy to other trail users, and as a safety measure, it is appropriate to be equipped with a device, such as a bell, that can be rung or otherwise activated when approaching others from behind, or entering blind spots such as corners, tunnels or similar obstacles, so as not to startle or surprise other people or animals. Some cities even require, by ordinance or decree, that cyclists or other fast-moving trail users must be equipped with such a device.

Relative to safety measures, the same logic applies to wildlife, or animals and pets in general, whether in remote wilderness or urban areas, or any setting in between. Providing an audible alert may prevent a trail user from startling an animal and minimize an unpredictable reaction or otherwise dangerous encounter. The scenario of a hiker startling a bear in the woods serves as a good example. If environmental factors are right, a hiker could walk up on a bear without either one seeing the other. If the bear becomes agitated the encounter may result in a negative outcome.

It is not practical to presume a trail user can reliably anticipate when an audible alert would be prudent in any given situation, nor is it always possible or safe for a cyclist, or the like, to manually ring a bell especially while braking or performing other tasks required to keep control of their bicycle. Furthermore, the act of ringing a bell can often be misinterpreted by the hearer as the person ringing the bell requesting permission to pass or declaring that they have right of way on a trail. The current disclosure presents a motion activated sound device that can automatically emit noise when in motion and can also be switched between on states and off states.

The motion activated sound device can be worn by the user, coupled to equipment, gear or clothing using a plurality of methods or stored therein. Examples of use context are included herein as a plurality of embodiments that allow it to be coupled via a bar mount, such as to a bicycle handlebar or seat post, a strap that can be worn on the body or a clip that can be attached to clothing. The device can be configured to operate in any mounted orientation; upright, sideways, upside down or any position in between. The user can be an adult, child, athlete, laborer or the like, or a domesticated pet or other animal.

Audible signals are generated electronically by the electronic motion activated sound device. Digital audio files can be stored in the electronic motion activated sound device and played at defined intervals ranging from continuous to infrequent. Within a plurality of operational modes, the audible signal can be played or turned off based on certain conditions such as the presence of motion or inactivity, or set with a timer. Through various methods, the user can adjust or program the interval, volume, tone, timbre, rhythm, frequency, pitch or dynamic of the audible signal to account for various usage scenarios and environmental conditions. The audible signal can be in the form of a melodic sound and, similar to telephone ringtones, can be set within, programmed or uploaded to the electronic motion activated sound device. This allows the user to customize the sounds emitted from the device to their personal preference with noises such as sound effects, pop culture references, animal noises and the like. Automatic adjustments to the audible signal can be preset by the user, built into the device or selected randomly by the electronic controls of the motion activated sound device.

The device can contain various electrical components. These components can function independently or be connected together through circuitry such as that provided by a printed circuit board or individual wires. The electronic assembly can have some level of logical functionality such that it processes inputs and outputs from the various electrical components to manage desired operation of the motion activated sound device.

In some embodiments, the device may include one or more processing devices, memory devices, network interface devices, speakers, display screens, sensors (e.g., motion detectors), and the like. The one or more network interface device may be configured to communicate data via a wired and/or wireless network, such as Wi-Fi, Bluetooth, ZigBee, Near-Field Communications (NFC), cellular data network, etc. The one or more memory devices may store computer instructions that implement any methods, operations, functions, programs, etc. described herein. The one or more processing devices may execute the computer instructions stored on the one or more memory devices to perform any methods, operations, functions, programs, etc. described herein.

The device can contain a plurality of separate pieces that make up an enclosure that houses the electrical components and provides structural support to various external electrical connections, switches and physical mounting options. Coupling of the motion activated sound device to the various mounts presented can be achieved with a modular interface that can allow multiple mounts to be connected to the motion activated sound device. The connection can be achieved using threaded fasteners, mechanical interference, hook and loop snaps, magnetic coupling, press-fit or snap-fit. Alternatively, the connection can be achieved by simply making the mounting option an integral part of the motion activated sound device.

Basic mode selection and adjustment of the motion activated sound device can be performed using electronic controls located on or within the device. Electronic controls can consist of buttons, slides, knobs, switches, or the like that allow the user to electronically manipulate the controls, The device can have a built-in LCD (liquid crystal display) or other type of screen that serves the same purpose of control and adjustment. The motion activated sound device can be connected to a computer, mobile computing device, tablet, mobile phone or the like to facilitate additional control, adjustment, activation or programming of the device.

A power distribution unit in the motion activated sound device can provide electrical power to the device and may obtain an electrical charge either internally from a rechargeable power storage device or externally through a peripheral electronic port connected to common power sources. Electronic communications with and data transfer to, and from, the motion activated sound device can be achieved through the same electronic peripheral electronic port using a communication cable or wirelessly with short-range or long-range wireless technology. For example, a wireless network, such as Wi-Fi, Bluetooth, ZigBee, Near-Field Communications (NFC), cellular data network, etc., may be used.

In the most basic mode of operation, the motion activated sound device emits a continuous audible signal only while the user is in motion. The audible signal emitted by the motion activated sound device may be used to alert other people or animals to the user's presence. This may be important when a user is moving in an area in which they may encounter or overtake another person or animal without a visual or audible indication otherwise.

A more advanced mode of operation can involve automatic adjustments to the audible signal based on device settings and on the presence, or absence, of motion. Elements or attributes of the audible signal, such as volume, tone, frequency, dynamics or melody may be programmed to change when the user stops moving. Increasing the sound level or changing the sound to a different alarm sound or melody while the user is at rest may be beneficial in use case situations where the idle user is blind to oncoming traffic by hills, corners or other obstacles. In such cases a louder or more distinguishable audible signal may be appropriate. Conversely, decreasing the volume while the user is at rest may be more appropriate in situations where other forms of communication are desired or a there exists a higher priority over the audible signal. Once motion resumes, the audible signal can continue as modified or return to the original, a random, or a predetermined setting.

The motion activated sound device can also be set to emit an audible signal only when not in motion so as to alert others within earshot of the device that the user is no longer moving or has otherwise stalled. Use cases may be similar to those described above where the user is blinded to oncoming traffic or for any situation where an audible signal from an idle user is of interest to others but is not needed when the user is in motion.

The motion activated sound device can be paired with and controlled by a mobile or other device through the use of a software application and wireless, or wired, connectivity. The application, downloaded onto the mobile device, can be used to change, start or stop operational modes, adjust settings, transmit data to and from the motion activated sound device or turn power off and on. Connectivity to a mobile device or computer, using a wireless or wired connection can also facilitate calibration of components internal to the motion activated sound device such as the motion detection component or other physical measurement components. The application may use the mobile device's built-in inertial measurement functionality to detect motion and use the mobile device's speakers, or auxiliary speakers connected to the mobile device, to emit sound. Additionally, the mobile device may use GPS functionality or wireless signal strength to measure distance between the motion activated sound device and the mobile device. The application may have functionality identical to the motion activated sound device such that, with the application in use, the mobile device can be mounted to the handlebar of a bicycle, left in a pocket, stored in a backpack, or left in any other reasonable place on the user or on their mode of transportation to function exactly as the motion activated sound device with one or more of the features described herein.

The software application can also be used to expand operational functionality of the motion activated sound device by using the mobile device as an auxiliary audible device. One such mode may be to emit an audible alarm on both the motion activated sound device and one, or multiple, mobile devices when the distance between any or all of the devices exceeds, or is within, a preset distance measurement. An example use-case may be to couple the motion activated sound device to an asset, animal or person and continuously monitor the distance between it and a mobile or other device. Should the distance exceed a preset measurement number, an audible alarm may be emitted from one or both devices. This mode could be useful in situations where the location of an asset is of interest or for monitoring the location of a child or other person. Similarly, the devices can be set to emit audible signals in a plurality of combinations when two or more devices are within a preset range in whatever use cases may be of interest to the user. In any of the modes described above, games or gaming activity could be devised between or among multiple users, further adding to the applications discussed thus far.

Use of the motion activated sound device is not limited to recreational activities, but may be used in any situation or high risk environment where the location of an individual relative to equipment or other users is paramount or the unexpected presence of a person may startle someone or present a safety hazard. A warehouse or factory worker may use the motion activated sound device while moving about a production area to alert forklift drivers to their presence. Workers performing tasks that limit their ability to see oncoming foot traffic or other hazards, such as a person engaged in heavy lifting or a task that must be performed peripatetically may use the motion activated sound device. Additionally, the motion activated sound device may have applications related to training of people or animals, monitoring of assets or people, safety protocols or other industrial uses.

These and other embodiments are discussed below with reference to FIGS. 1-14. However, those skilled in the art will readily appreciate that the detailed description given herein with respect to these drawings is for explanatory purposes only and should not be construed as limiting.

FIG. 1 is a top perspective view of an embodiment of an electronic motion activated sound device 100, in accordance with some embodiments. As shown, the motion activated sound device 100 can include a base assembly 110, a bar mount 200, a tubing mount interface 201, electronic controls 130, 131 and 132, an embedded sound emitting component 140 (hidden by the base assembly 110, clearly labeled in FIG. 6) and a peripheral electronic port 120.

The base assembly 110 is an enclosure capable of housing electrical componentry. Openings can exist in the surface to for the extension of components outside the enclosure such as buttons and peripheral inputs and outputs. Basic control of the motion activated sound device 100 can be accomplished using one, or more, electronic controls 130, 131 and 132 located on or within the base assembly 110. Adjustability of the motion activated sound device 100 using the electronic controls 130, 131 and 132 can include such functions as power on and off, volume adjustment, motion sensitivity settings, or changes to other characteristics related to the audible signal. Advanced control of the motion activated sound device 100 can be accomplished using an electrical communications cable connected to the peripheral electronic port 120.

The bar mount 200 can contain a tubing mount interface 201 that allows it to be coupled with tubing of a plurality of cross sections or profiles. Thus, the motion activated sound device 100 can then be coupled to an array of items, generally tubular in shape, in a rigid manner yet readily decoupled when desired.

Figure 2:
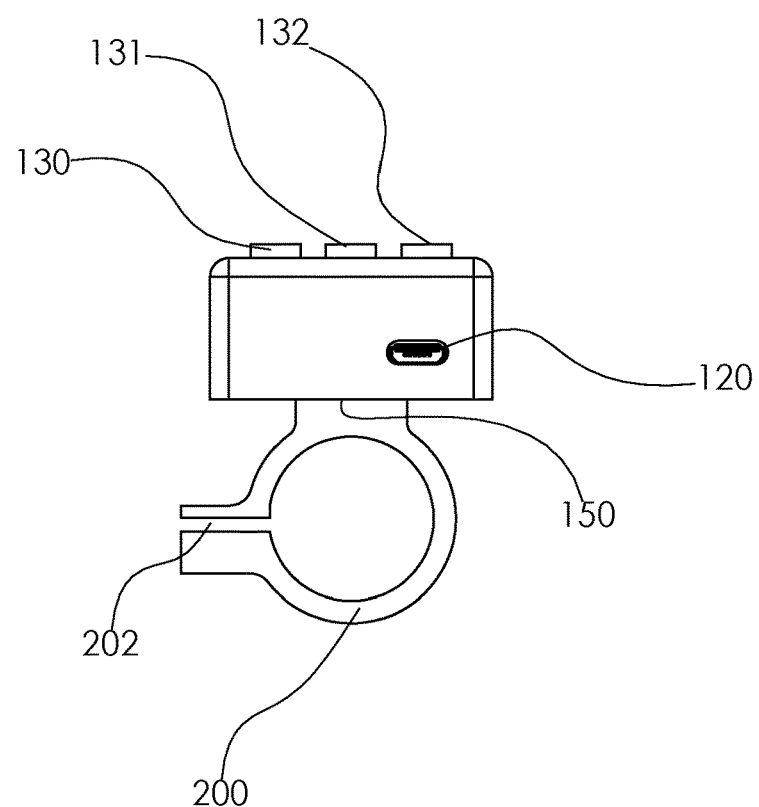
FIG. 2 illustrates a side view of the sound device shown in FIG. 1.
Figure 3:
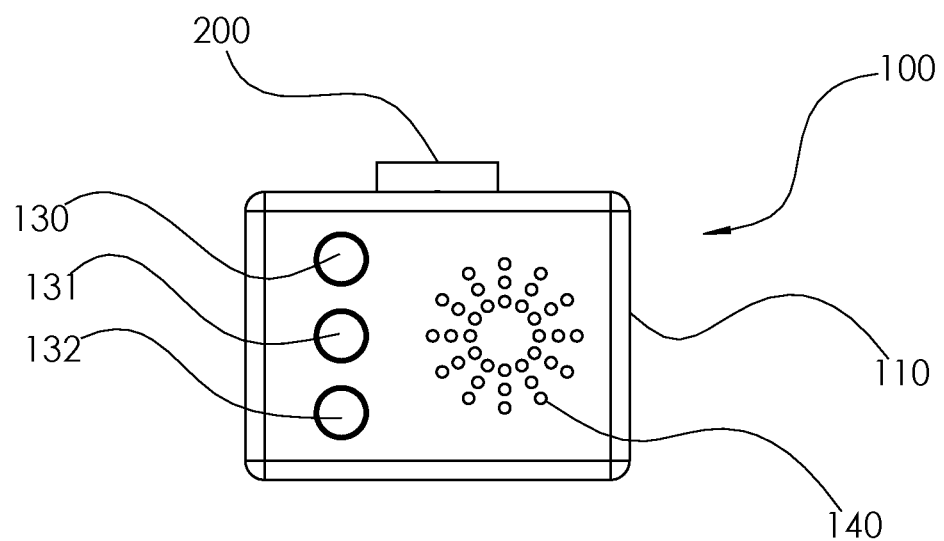
FIG. 3 illustrates a top view of the sound device shown in FIG. 1.
Figure 4:
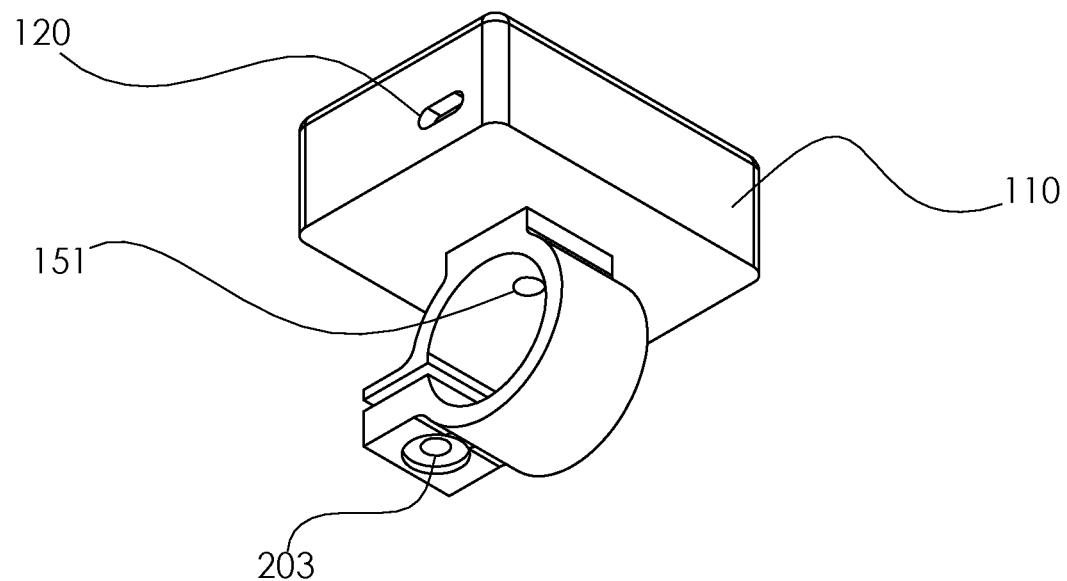
FIG. 4 illustrates the bottom perspective view of the sound device shown in FIG. 1.

Referring to FIGS. 2-4, wherein like numerals indicate corresponding parts throughout the views, embodiments of the motion activated sound device 100 are shown. A base mount 150 that enables the bar mount 200 to be coupled with the motion activated sound device 100 may be included. Alternatively, the base mount 150 may be Integral to the base assembly 110 thereby allowing direct connection of the bar mount 200 to the base assembly 110. The bar mount 200 includes a method to secure the mount to a piece of tubing or similar material that may be in the form of a mount clamp 202 secured by a mount fastener 203. The bar mount 200 also includes a method to secure the mount to the base assembly 110 that may include a base fastener 151.

Figure 5:
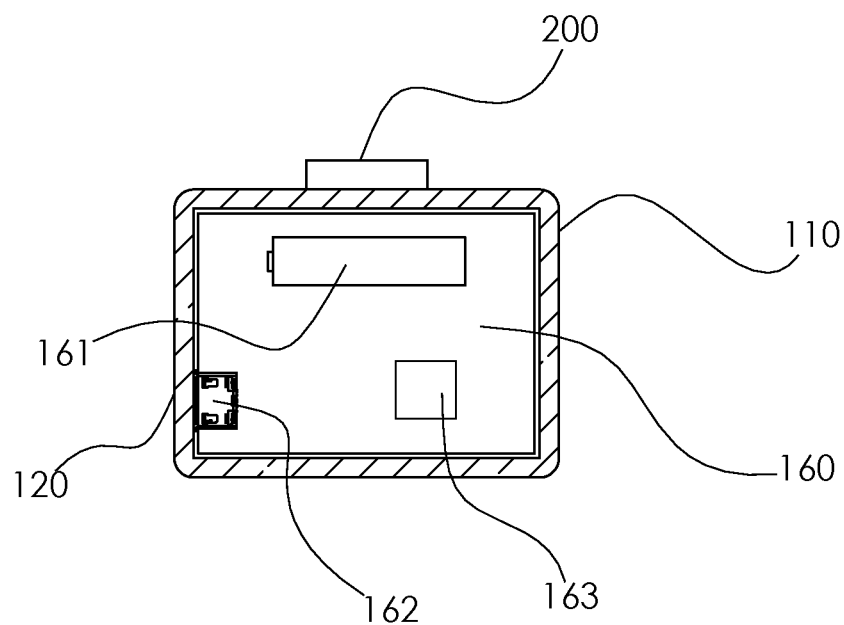
FIG. 5 illustrates a top view of a simplified circuit board, in accordance with some embodiments.

FIG. 5 illustrates the electronics assembly 160 which can be coupled with the bottom half of the base assembly 110. The bar mount 200 can be partially seen under the base assembly 110 indicating a top view orientation of the figure. The electronics assembly 160 can contain an internal power source 161, motion detector 163 and an electrical connector 162 aligned with the peripheral electronic port 120. The internal power source 161 may include a battery powered circuit (the battery may be included internally in the motion activated sound device 100 or may be located externally from the motion activated sound device 100 and electrically coupled to the motion activated sound device 100), an electrically powered circuit, a capacitor, an inertial power unit, or some combination thereof. In some embodiments, the motion activated sound device 100 may be tethered to an external battery or electrical source which isn't part of the motion activated sound device 100 and/or is sold separately from the motion activated sound device 100.

The electronics assembly 160 can include electronic circuitry and other electrical components that facilitate communication and signal transmission among and between the other electrical components as well as logic functionality to manage operation of the device. For example., the electronics assembly 160 may include one or more processing devices, memory devices, network interface devices, speakers, sensors (e.g., motion detectors 163), and the like. The components included in the electronics assembly 160 may be communicatively coupled with each other via circuitry. The motion detector 163 can sense when the motion activated sound device 100 is at rest or in-motion, providing electrical signals to other components, such as a speaker that is configured to emit sound. The motion detector 163 may include a sensor unit, an embedded computer (e.g., processing device), and/or hardware (e.g., mechanical component). The motion detector 163 may be an accelerometer, a gyroscope, and/or magnetometer. In some embodiments, the motion detector 163 may be a micro electro-mechanical system (MEMS) sensor. The MEMS sensor may include a suspended mass between a pair of capacitive plates that are configured to measure an amount of movement based on a difference in electric potential created by the suspended mass, The motion detector 163 may detect movement of the device 100 and determine an amount of acceleration in one or more axes (e.g., x, y, and z). The amount of acceleration may represent an amount of movement of the device 100 and may be compared to a threshold level that is configurable by a user. If the movement of the device 100 is above a threshold level, then a control signal may be transmitted by a processing device included in the electronics assembly 160 to a speaker to cause the speaker to emit sound. The sound that is emitted may be based on a digital audio file that is stored on the device 100, or accessed remotely (e.g., at a server or on another computing device).

Internal power for the motion activated sound device 100 can be provided by the power source 161, while external power can be provided by connection to a common electrical source through the peripheral electronic port 120.

Figure 6:
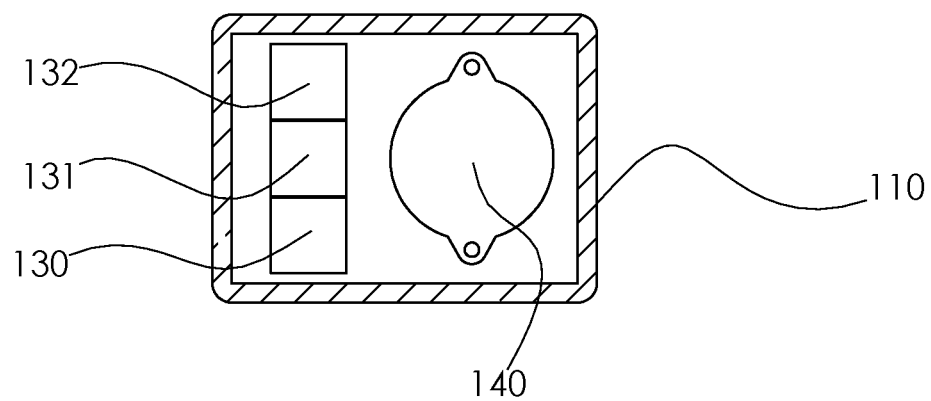
FIG. 6 illustrates a bottom view of the simplified circuit board shown in FIG. 5.

FIG. 6 illustrates the top half of the base assembly 110 in bottom view orientation. Shown are the electronic controls 130, 131 and 132 which can be mounted anywhere within the base assembly 110. Also shown is the sound emitting component 140.

Figure 7:
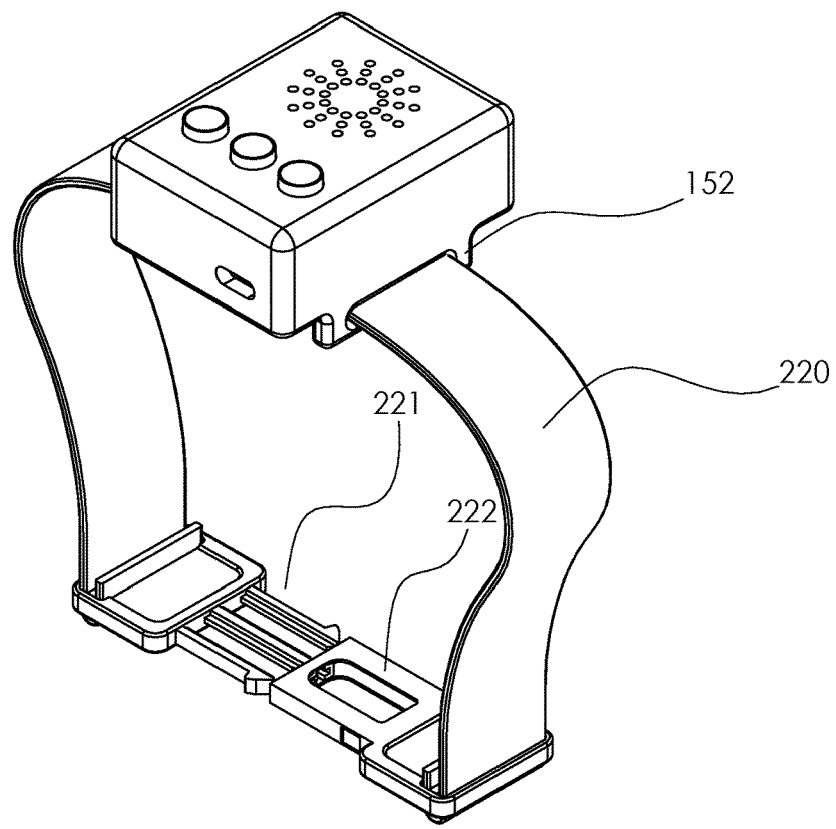
FIG. 7 illustrates a perspective view of an embodiment of the electronic motion activated sound device showing a method of coupling the sound device to an object, using a strap, in accordance with some embodiments.

FIG. 7 illustrates a perspective view of an embodiment of the electronic motion activated sound device 100 showing a method of coupling the device to an object, using a strap 220, in accordance with some embodiments. Wherein like numerals indicate corresponding parts throughout the views, an embodiment is shown where strap loops 152 can be integral to the base assembly 110 which can be coupled with a strap 220. The strap 220 can be adjustable in length to allow the device to be coupled to a plurality of equipment or gear, as well as on body limbs such as arms, legs and the like. A male clasp 221 and a female clasp 222 can be used to secure the strap 220 as desired and can also provide length adjustability to the strap 220, thus, allowing the motion activated sound device 100 to be coupled to a plurality of options.

Figure 8:
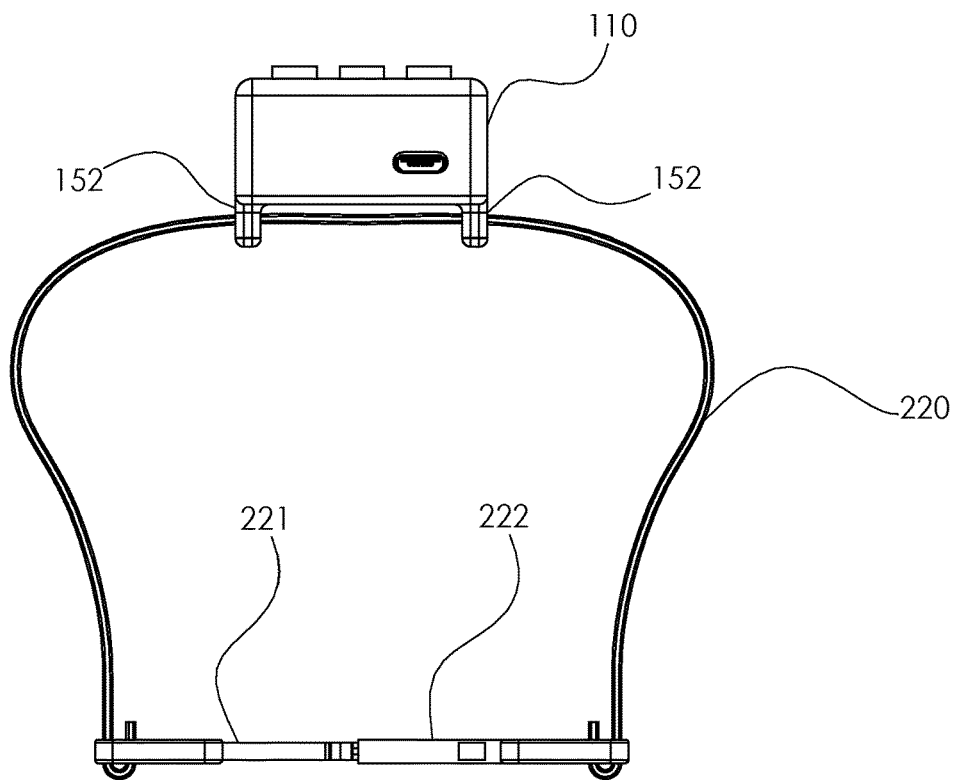
FIG. 8 illustrates a side view of the coupling method shown in FIG. 7.

FIG. 8 illustrates an alternate side view of the motion activated sound device 100 shown in FIG. 7.

Figure 9:
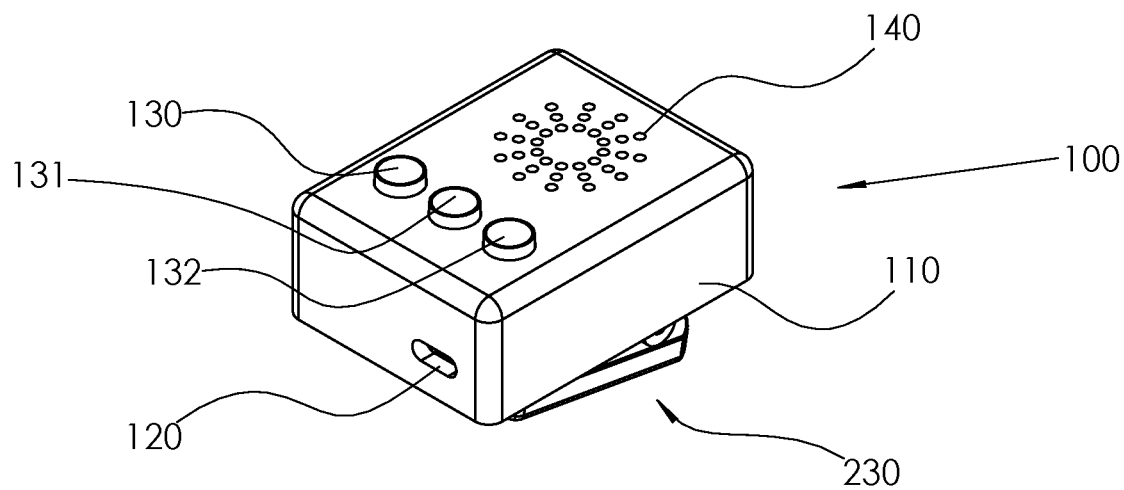
FIG. 9 illustrates a perspective view of an embodiment of the electronic motion activated sound device showing a coupling device for coupling the sound device to a thin object such as a strap or portion of fabric, in accordance with some embodiments.
Figure 10:
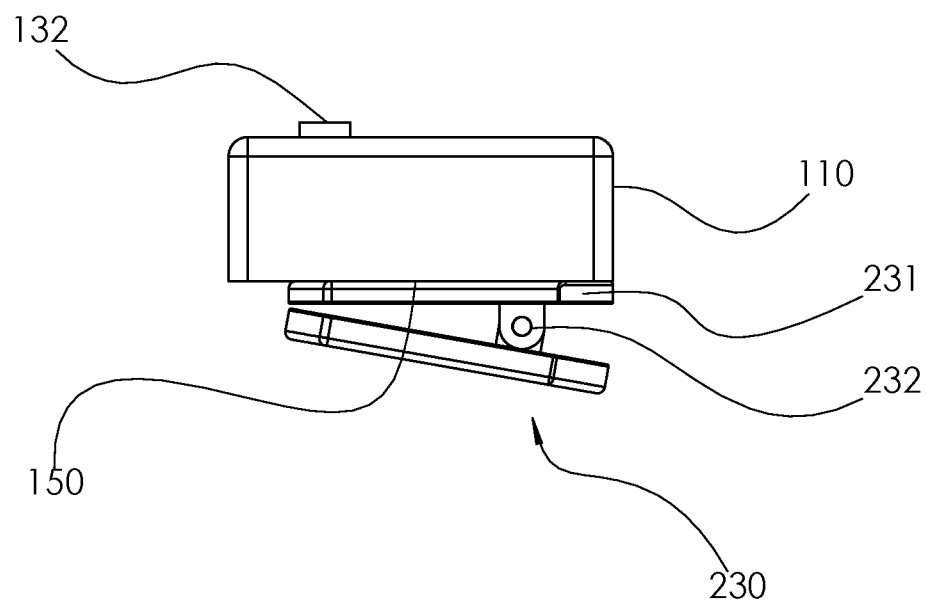
FIG. 10 illustrates a side view of the coupling device shown in FIG. 9.
Figure 11:
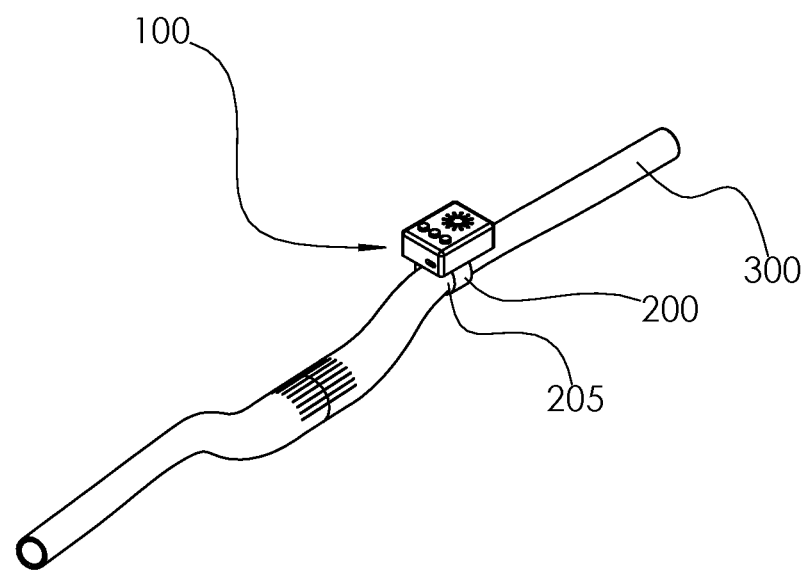
FIG. 11 illustrates a perspective view of the device coupled to the handlebar of a bicycle.
Figure 12:
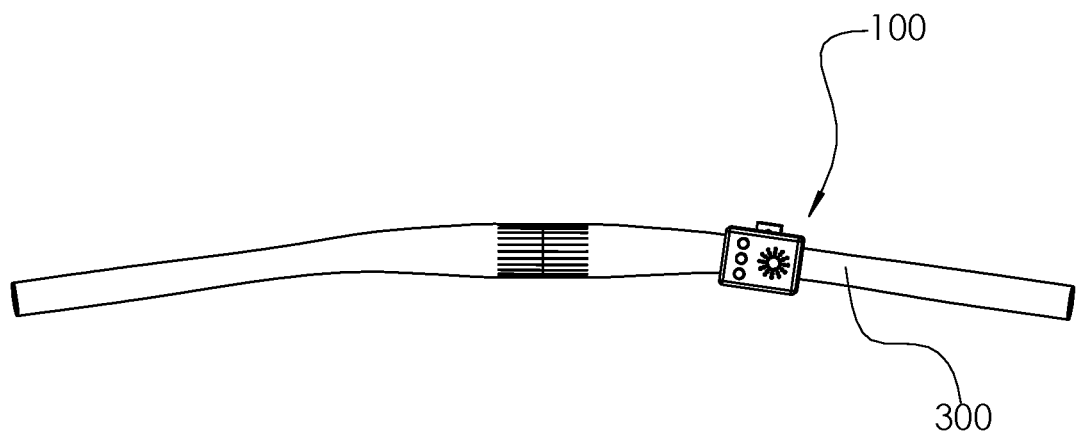
FIG. 12 illustrates a top view of the device and handlebar shown in FIG. 11.
Figure 13:
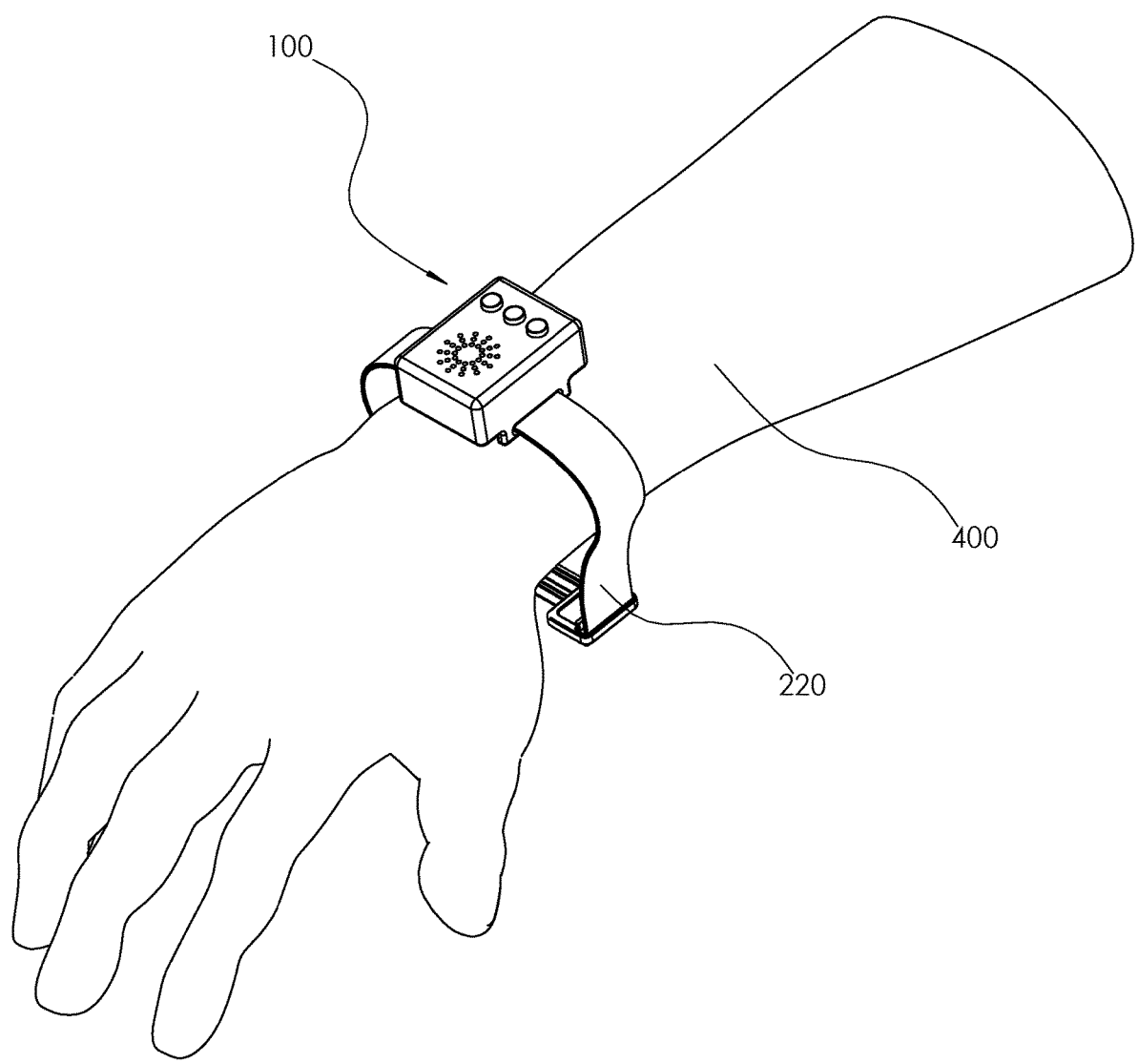
FIG. 13 illustrates the electronic motion activated sound device coupled to a wrist.
Figure 14:
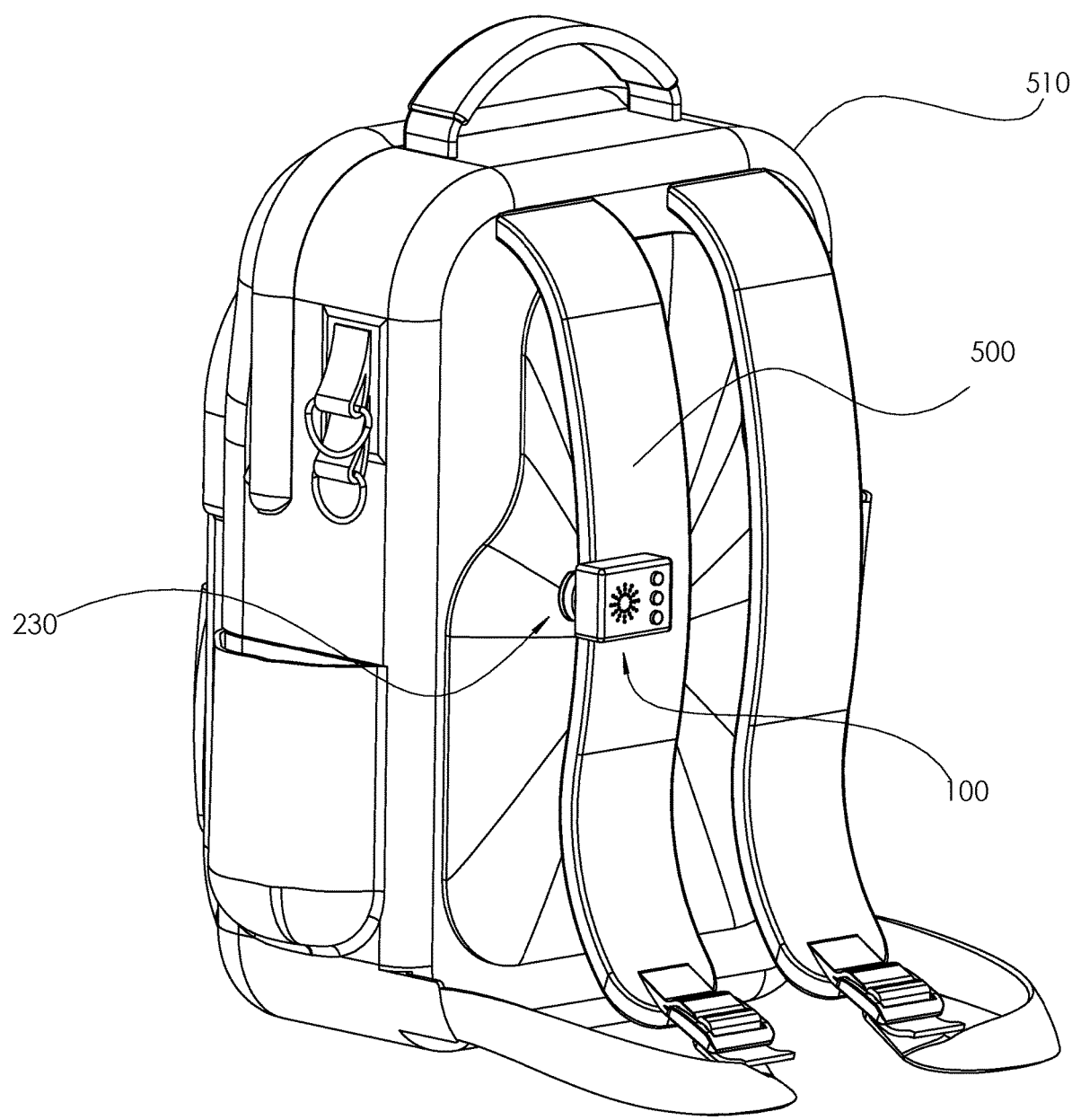
FIG. 14 illustrates the electronic motion activated sound device coupled to a backpack strap.

FIGS. 9-10 illustrate a perspective view and alternate side view of an embodiment of the electronic motion activated sound device 100 showing a clip-like device for coupling the sound device to a thin object such as a strap or portion of fabric, in accordance with some embodiments. Wherein like numerals indicate corresponding parts throughout the views, an embodiment is shown where a dip device 230, consisting dip mount 231 that articulates about a dip spring pin 232 to provide a damping action such that the motion activated sound device 100 can be coupled as desired.

The dip mount 231 can be coupled to the base assembly 110 by a plurality of fastening means. The dip mount 231 can be decoupled from the base mount 150 as desired to allow coupling of the other mounting options to the base assembly 110 as detailed herein, Alternatively, the dip mount 231 can be integral to the base assembly 110 allowing direct connection to the strap 220.

FIGS. 11-14 illustrate some examples of contextual use of the motion activated sound device 100 and include; mounting the device to a bicycle handlebar 300 using the bar mount 200, mounting the device to a wrist 400 with the strap 220 mounting option and mounting the device to a backpack 510 along a thin piece of material such as on the backpack strap 500.

Figure 47:
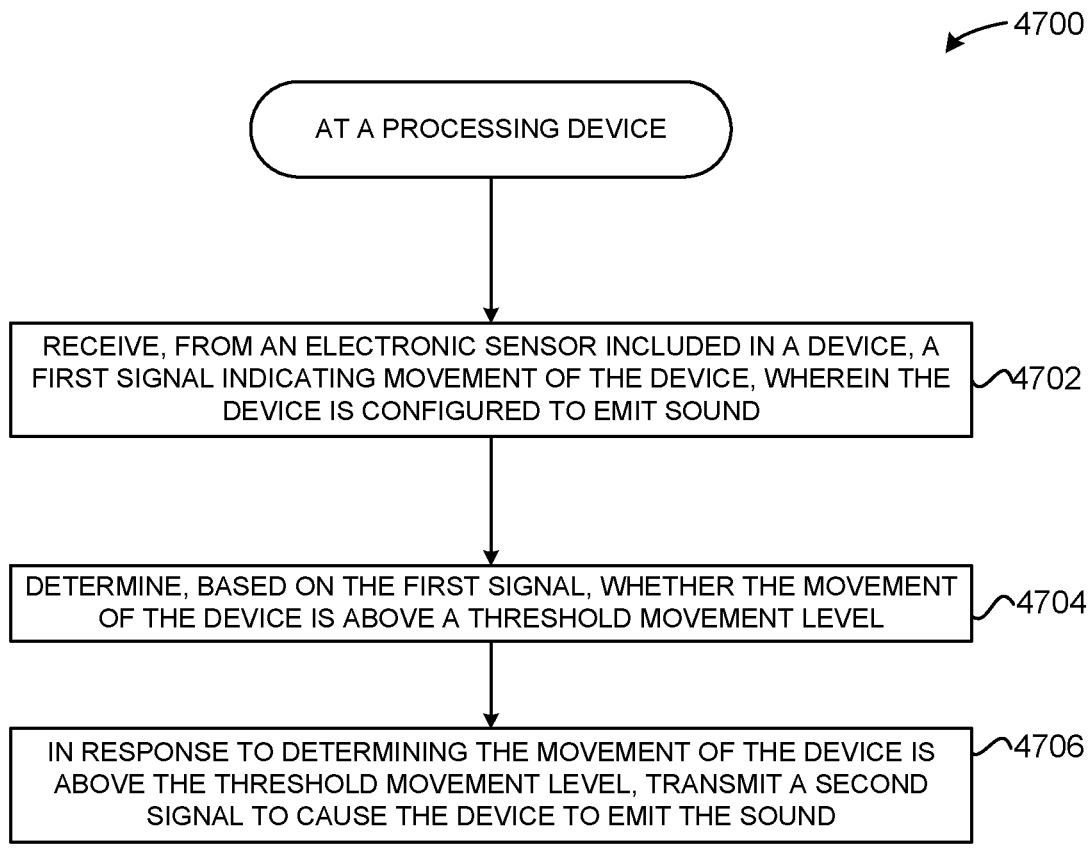
FIG. 47 is a flow diagram generally illustrating a method for controlling the motion activated sound device according to the principles of the present disclosure.

FIG. 47 is a flow diagram generally illustrating a method 4700 for controlling the motion activated sound device 100 according to the principles of the present disclosure. The method 4700 is performed by processing logic that may include hardware (circuitry, dedicated logic, etc.), software, or a combination of both. The method 4700 and/or each of its individual functions, routines, subroutines, or operations may be performed by one or more processing devices of a computing device. In some embodiments, the method 4700 may be performed by a single processing thread. Alternatively, the method 4700 may be performed by two or more processing threads, each thread implementing one or more individual functions, routines, subroutines, object-oriented methods, or operations of the methods.

For simplicity of explanation, the method 4700 is depicted and described as a series of operations. However, operations in accordance with this disclosure can occur in various orders and/or concurrently, and/or with other operations not presented and described herein. For example, the operations depicted in the method 4700 may occur in combination with any other operation of any other method disclosed herein. Furthermore, not all illustrated operations may be required to implement the method 4700 in accordance with the disclosed subject matter. In addition, those skilled in the art may understand and appreciate that the method 4700 could alternatively be represented as a series of interrelated states via a state diagram or events.

At 4702, the processing device may receive, from an electronic sensor (e.g., motion detector 163) included in a motion activated sound device 100, a first signal indicating movement of the motion activated sound device 100.

At 4704, the processing device may determine, based on the first signal, whether the movement of the motion activated sound device 100 is above a threshold movement level. In some embodiments, the processing device may determine whether the movement of the motion activated sound device 100 is above the threshold level by measuring an amount of acceleration experienced by the electronic sensor (e.g., motion detector 163). The user may use a software application executing on a computing device (e.g., smartphone) to configure the threshold movement level to any suitable amount, value, etc. Further, the sound that is emitted by the motion activated sound device 100 and/or the computing device may be configured using the software application. In some embodiments, the user may use the software application to upload or download a sound (e.g., noise, recording, song, etc.) to be emitted by the motion activated sound device 100 and/or the computing device.

At 4708, in response to determining the movement of the motion activated sound device 100 is above the threshold movement level, the processing device may transmit a second signal to cause the motion activated sound device 100 to emit the sound. In some embodiments, the second signal may be transmitted to a speaker included in the electrical assembly of the motion activated sound device 100. In some embodiments, the processing device may modify an attribute of the sound based on determining the movement of the motion activated sound device 100 is below a threshold movement level. The attribute may include a volume, a tone, a frequency, a melody, or some combination thereof.

In some embodiments, the processing device may transmit a control signal to a computing device (e.g., smartphone)

external to or from the motion activated sound device 100. The control signal may, cause the computing device to emit the sound. In some embodiments, the sound emitted by the computing device and the motion activated sound device 100 may be the same and may be synchronized such that the sound is played concurrently by the computing device and the motion activated sound device 100. In some embodiments, the sound played by the computing device and the sound played by the motion activated sound device 100 may be different. For example, the sound played by the computing device may have one or more attributes (e.g., volume, tone, melody, etc.) that are different than the sound played by the motion activated sound device 100.

In some embodiments, the processing device may determine a distance between the motion activated sound device 100 and a computing device (e.g., smartphone) external to the motion activated sound device 100. In some embodiments, based on the distance, the processing device may cause the computing device to emit the sound, For example, if the motion activated sound device 100 is greater than a threshold distance away from the computing device and the user is in possession of the computing device, then the computing device may be used to emit the sound.

Figure 48:
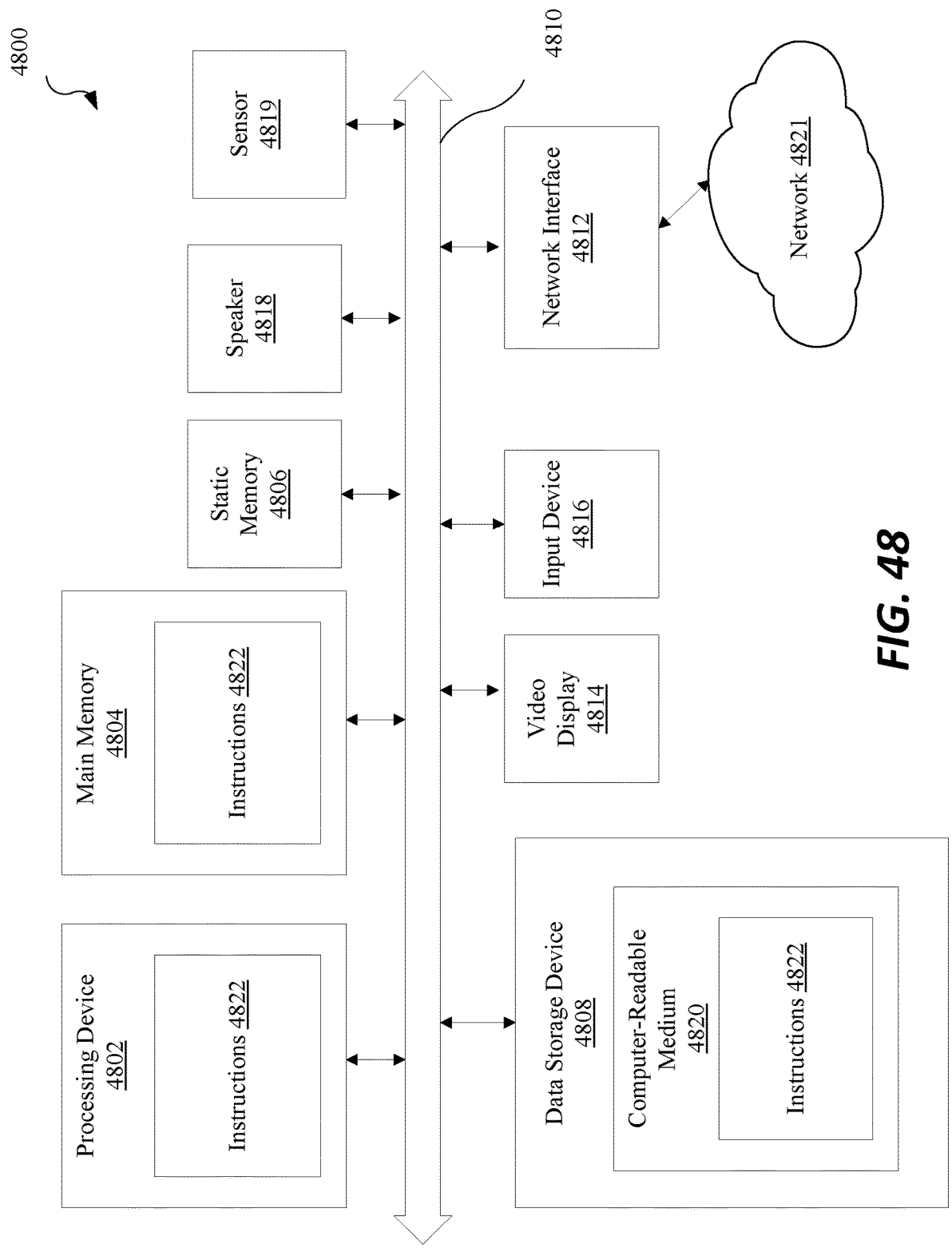
FIG. 48 illustrates a computer system in accordance with some embodiments.

FIG. 48 shows an example computer system 4800, which can perform any one or more of the methods described herein, in accordance with one or more aspects of the present disclosure. In one example, computer system 4800 may include a computing device and correspond to motion activated sound device 100, a smartphone, or any suitable component. The computer system may be connected (e.g., networked) to other computer systems in a LAN, an intranet, an extranet, or the Internet, including via the cloud or a peer-to-peer network. The computer system may operate in the capacity of a server in a client-server network environment. The computer system may be a personal computer (PC), a tablet computer, a wearable (e.g., wristband), a set-top box (STB), a personal Digital Assistant (PDA), a mobile phone, a camera, a video camera, an Internet of Things (IoT) device, or any device capable of executing a set of instructions (sequential or otherwise) that specify actions to be taken by that device. Further, while only a single computer system is illustrated, the term "computer" shall also be taken to include any collection of computers that individually or jointly execute a set (or multiple sets) of instructions to perform any one or more of the methods discussed herein.

The computer system 4800 includes a processing device 4802, a main memory 4804 (e.g., read-only memory (ROM), flash memory, solid state drives (SSDs), dynamic random access memory (DRAM) such as synchronous DRAM (SDRAM)), a static memory 4806 (e.g., flash memory, solid state drives (SSDs), static random access memory (SRAM)), a sensor 4819, and a data storage device 4808, which communicate with each other via a bus 4810.

Processing device 4802 represents one or more general-purpose processing devices such as a microprocessor, central processing unit, or the like. More particularly, the processing device 4802 may be a complex instruction set computing (CIBC) microprocessor, reduced instruction set computing (RISC) microprocessor, very long instruction word (VLIW) microprocessor, or a processor implementing other instruction sets or processors implementing a combination of instruction sets. The processing device 4802 may also be one or more special-purpose processing devices such as an application specific integrated circuit (ASIC), a system on a chip, a field programmable gate array (FPGA), a digital signal processor (DSP), network processor, or the like. The processing device 4802 is configured to execute instructions for performing any of the operations and steps discussed herein.

The computer system 4800 may further include a network interface device 4812. The computer system 4800 also may include a video display 4814 (e.g., a liquid crystal display (LCD), a light-emitting diode (LED), an organic light-emitting diode (OLED), a quantum LED, a cathode ray tube (CRT), a shadow mask CRT, an aperture grille CRT, a monochrome CRT), one or more input devices 4816 (e.g., a keyboard and/or a mouse or a gaming-like control), and one or more speakers 4818 (e.g., a speaker). In one illustrative example, the video display 4814 and the input device(s) 4816 may be combined into a single component or device (e.g., an LCD touch screen). The speaker 4818 may be configured to emit sound as described herein. The sensor 4819 may correspond to the motion detector 163.

The data storage device 4816 may include a computer-readable medium 4820 on which the instructions 4822 embodying any one or more of the methods, operations, or functions described herein is stored. The instructions 4822 may also reside, completely or at least partially, within the main memory 4804 and/or within the processing device 4802 during execution thereof by the computer system 4800. As such, the main memory 4804 and the processing device 4802 also constitute computer-readable media. The instructions 4822 may further be transmitted or received over a network 4821 via the network interface device 4812. The network 4821 may be a local area network, wide area network, a mesh network, or the like.

While the computer-readable storage medium 4820 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

The various aspects, embodiments, implementations or features of the embodiments can be used separately or in any combination. Various aspects of the embodiments can be implemented by software, hardware or combinations of hardware and software. The embodiments can also be embodied as computer readable code on a computer readable medium for controlling manufacturing operations or as computer readable code on a computer readable medium for controlling a manufacturing line, The computer readable medium is any data storage device that can store data which can thereafter be read by a computer system. Examples of the computer readable medium include read-only memory, random-access memory, CD-ROMs, HDDs, DVDs, magnetic tape, and optical data storage devices. The computer readable medium can also be distributed over network-coupled computer systems so that the computer readable code is stored and executed in a distributed.

Embodiments of the switchable mechanical motion activated sound device may consist of one or more ringers, one or more strikers, one or more attachment devices and a means of coupling the striker(s) and ringer(s) to said attachment device or devices. In the on state, the striker, ringer or both can freely oscillate with varying magnitude, position or frequency, relative to each other or about a central point. This movement, produced while the switchable mechanical motion activated sound device is in motion, allows contact between the striker and ringer, thereby emitting sound. A means of manipulating either the striker, the ringer, a wedge, brace, cam or damping device, or any combination thereof, such that the sound produced is greatly reduced or eliminated is used to set the switchable mechanical motion activated sound device to a dampened or off state. In this state, the switchable mechanical motion activated sound device may emit reduced or no sound even while in motion.

The ringer can be in the shape of any type of bell, a bar (similar to a xylophone), a circular or semi-circular shape, or any other shape and material which can be constructed to have a resonant frequency within the range of human hearing. The typical range of human hearing is between 20 Hz and 20,000 Hz, allowing the possibility for the ringer to exist in size from very large to very small. Additionally, certain characteristics of the sound, or the level of sound, can be altered by changing the shape, weight or other physical attributes of the striker and/or ringer, or by modifying the attachment device. As a few examples, the increased mass of a heavier striker may produce a louder sound; a longer spring coupled to the striker may produce a louder sound as the amplitude of motion increases; a stiffer spring may decrease the frequency of the oscillations. Combined with the ability to reduce the overall sound produced by adjusting the device below the on state, but not fully to the off state, variable damping of the device can be achieved.

The striker can be in the shape of an ordinary bell clapper, a bar, a hoop, a semi-circle, an organic shape, or virtually any other shape imaginable such as a small scale bicycle or Statue of Liberty. It can cause the ringer to emit sound when it is struck from the outside, from the inside, or from an adjacent position (above, below, from the right, from the left, etc.). Unlike the ringer, the striker does not need to have a resonant frequency, but simply the ability to impact the ringer. In general, a striker made from a hard material will have a higher likelihood of creating a clear, loud sound from the ringer.

In order for the switchable mechanical motion activated sound device to emit sound when in motion, the striker and the ringer must be able to contact one another. The switchable mechanical motion activated sound device can be configured with a plurality of ringers, a plurality of strikers, or both. In general, it is best to allow a greater degree of freedom (of motion) for the striker(s) and a lesser degree of freedom (of motion) for the ringer(s) or vice versa in order to emit a larger amplitude sound.

A lesser degree of freedom for the ringer can be created by coupling the ringer to the attachment device in a way which prevents large amplitude movements, but in a way which does not constrain the ringer such that the amplitude of the audible resonant frequency is too small to be heard. Similarly, a lesser degree of freedom in the striker can be created by more rigidly coupling the striker relative to the attachment device.

A greater degree of freedom for the ringer or the striker can be created by coupling either to the attachment device or to the activation component (lever, switch, button, etc.) using a flexible material such as, but not limited to, a cable, a spring, string or rope, a piece of fabric, rubber, or any other flexible material. A spring used to couple them can be in the form of a compression spring, a torsion spring, a leaf spring, an extension spring, or any other shape of spring material such as steel or plastic.

The switchable mechanical motion activated sound device can also be configured in such a way that both the ringer and the striker have a large degree of freedom to create a different audible effect.

The motion activation state of the switchable mechanical motion activated sound device can be changed by engaging a switching component such as, but not limited to, a lever, button, or switch. There are a plurality of ways to accomplish this. When the user engages said component, the striker can be moved into a position where it can contact the ringer or vice versa: the ringer can be moved into a position where it can contact the striker. This process can be reversed and the user can engage the switching component to move either the ringer or the striker away from the other such that they are not able to contact one another.

Another option is that the switching component can move an interference component, such as, but not limited to a wedge, brace, ring, or damper, between the ringer and striker such that the ringer and striker cannot contact one another. The switching component can then be engaged such that the interference component is removed from between the ringer and striker to allow the ringer and striker to contact one another.

The term "on" is used to mean the state in which sound can be produced and the term "off" is used to mean the state in which either a very small amount of sound occurs or no sound at all.

An exemplary use case of the switchable mechanical motion activated sound device can be configured to be mounted to the handlebar of a bicycle. As the handlebar of the bicycle moves, the device will move with it, thereby producing a sound when the switching component is in the on condition. When the switching component is in the off condition, the device will cease to sound or greatly decrease in sound as the handlebar continues to move. The switchable mechanical motion activated sound device can be mounted in any orientation though typically, depending on the configuration of the device, one or two orientations will allow the ringer and striker to impact more frequently or with more force to produce a more frequent or louder sound.

The switchable mechanical motion activated sound device can be turned off when the lever, button, or switch moves the ringer or the striker to a position where it is either a) unable to be contacted by the other, be it the ringer or striker, b) pressed against the other, c) an intermediate component or series of components is placed in such a position as to prevent the ringer and striker from contacting one another, or d) the ringer is dampened by a separate body so that it does not ring when struck.

There are other means of configuring a ringing device which can be shutoff, many of which don't require a third member such as a button, switch or lever. One such option is to physically reposition the moveable member, be it the ringer or the striker, to a location where it cannot contact the other. This can be done by sliding, pivoting, bending, twisting, compressing, or extending one of the components to a location where it cannot be reached by the other. Another such option is to physically secure the moveable member to prevent the ringer and striker from contacting one another. For example, if the ringing device is comprised of a striker and a ringer with the ringer being the moveable member and being external to the striker, the flexible member holding the ringer can be compressed and the ringer can be twisted to engage teeth on the attachment member, thereby preventing the ringer from contacting the striker. "Moveable member" is defined herein as the component with the greater degree of freedom of the two.

A possible configuration of the switchable mechanical motion activated sound device includes a secondary striker which can be used manually, as needed, to strike the ringer. This can be done within almost any configuration of the ringing device and with almost any form of striker. This can be configured to function when the switching component is in the off or the on position. It enables the user to alert others in the vicinity when the switching component is in the off position or when the switching component is in the on position, but the motion of the device is of insufficient amplitude to otherwise generate sound.

The switchable mechanical motion activated sound device can be configured to be attached to nearly anything including but not limited to, a backpack, a dog collar, the strap of a bag, the body or extremity of a user, the top of a medical delivery robot in a hospital, the horn of a horse's saddle, a wheelchair, bicycle, motorized scooter, or ski pole.

FIGS. 15-19 illustrate a first embodiment of the switchable mechanical motion activated sound device 600 wherein an internal ringer 601 with an axis 901 can be coupled to an external striker 602 with an axis 902. Ringer 601 and striker 602 can be coaxial. Motion of the striker 602 can create sound when the actuation device 603 is in the on state but cannot create sound or the sound is greatly reduced when the actuation device 603 is in the off state. As shown, the switchable mechanical motion activated sound device 600 can include a ringer 601, coupled to the switchable mechanical motion activated sound device 600 by a ringer attachment component 606, striker 602, spring 604, bar mount 200 and an actuation device 603. Motion of the switchable mechanical motion activated sound device 600 moves the striker 602 to strike the ringer 601 to produce a sound when the actuation device 603 is in the on state.

Figure 15:
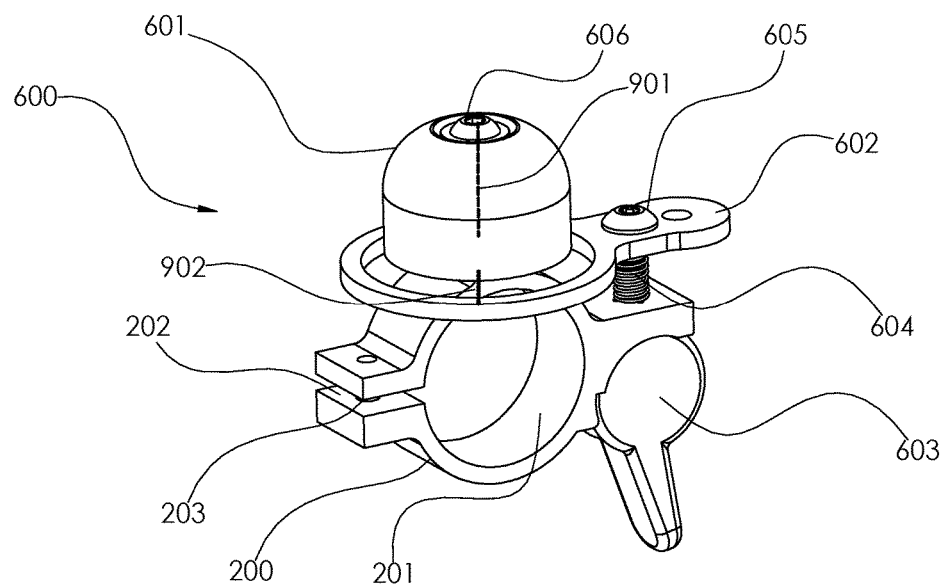
FIG. 15 illustrates a perspective view of an embodiment of the switchable mechanical motion activated sound device wherein the ringer is coupled internally to an external striker and motion of the striker cannot create sound with the actuation device in the off state.
Figure 16:
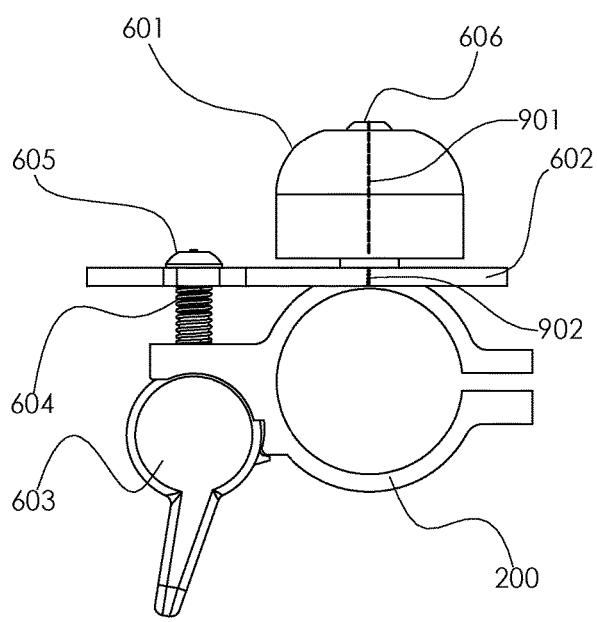
FIG. 16 illustrates a side view of the sound device shown in FIG. 15, showing the actuation device in the off state, having moved the striker away from the ringer such that the striker and ringer cannot contact one another.
Figure 17:
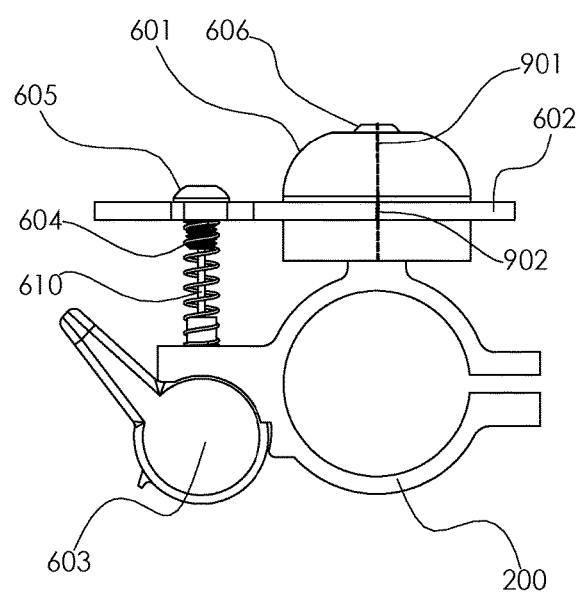
FIG. 17 illustrates a side view of the sound device shown in FIG. 15, showing the actuation device in the on state, having moved the striker into a position where the striker and ringer can contact one another.
Figure 18:
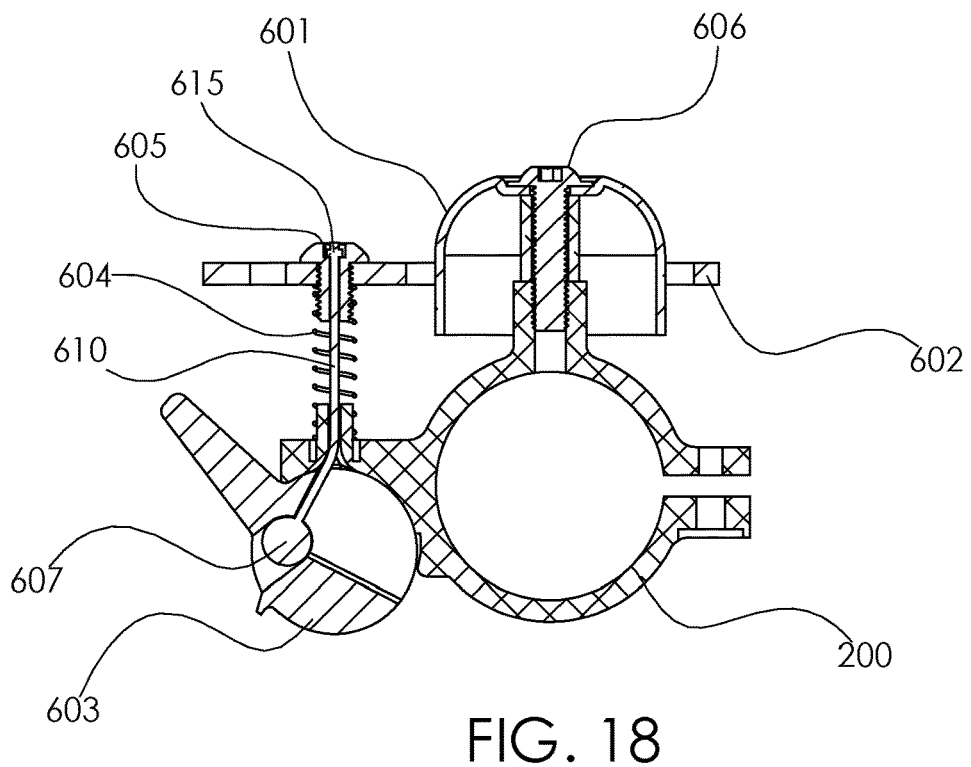
FIG. 18 illustrates the cross section of a side view of the sound device shown in FIG. 15, wherein the actuation device is shown in the on state and the striker and ringer can contact one another.
Figure 19:
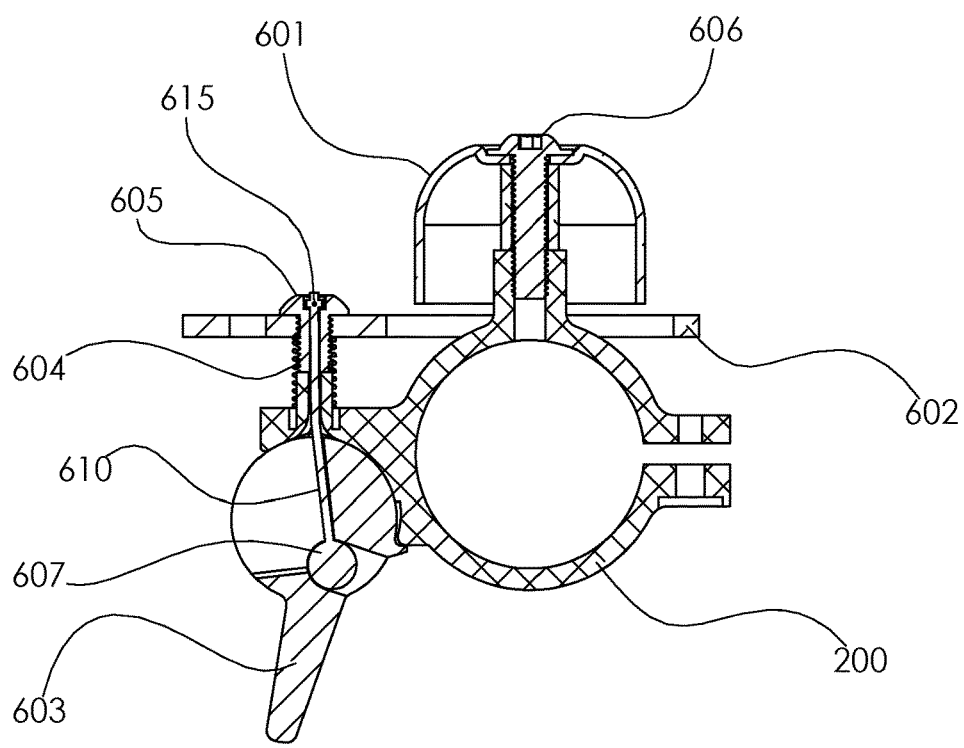
FIG. 19 illustrates the cross section of a side view of the sound device shown in FIG. 15, wherein the actuator is in the off state such that the external striker has been moved away from the ringer and cannot contact the ringer.

FIGS. 15, 16, and 19 illustrate the actuation device 603 in the off state preventing the striker 602 from contacting the ringer 601, in turn minimizing or eliminating the ringing sound. In the off state, the striker 602 can be axially spaced apart from the ringer 601, such that there is no axial overlap between them. FIGS. 17 and 18 illustrate the actuation device 603 in the off state, a position in which the external striker 602 can contact the ringer 601. Rotational movement of the actuation device 603 (clockwise, in FIG. 19) from the off state to the on state (FIG. 18) moves the external striker 602 into closer proximity to the internal ringer 601. In contrast, rotational movement of the actuation device 603 (counterclockwise, in FIG. 18) from the on state initiates increasingly restrictive motion of the external striker 602, gradually dampening amplitude of motion and, thereby, reducing the sound emitted from the device 600. Full retraction of the striker 602 into the off state (FIG. 19) moves the striker 602 away from the ringer 601 such that little or no sound is emitted from the device 600.

FIGS. 20-25 illustrate views of another embodiment of the switchable mechanical motion activated sound device 600 wherein an internal striker 602 with an axis 902 can be coupled with a ringer 601 having an axis 901. As with other embodiments, the ringer 601 and striker 602 can be coaxial. Embodiments of the switchable mechanical motion activated sound device 600 can include a ringer 601 suspended above a movable internal striker 602 by a ringer arm 608 coupled to a ringer post 609 with an arm fastener 611. An actuation device 603 can turn the switchable mechanical motion activated sound device 600 from an on state to an off state, and back again, to control sound emitted by the ringer 601. In the shown embodiment, the switchable mechanical motion activated sound device 600 is coupled to a bar mount 200.

Figure 22:
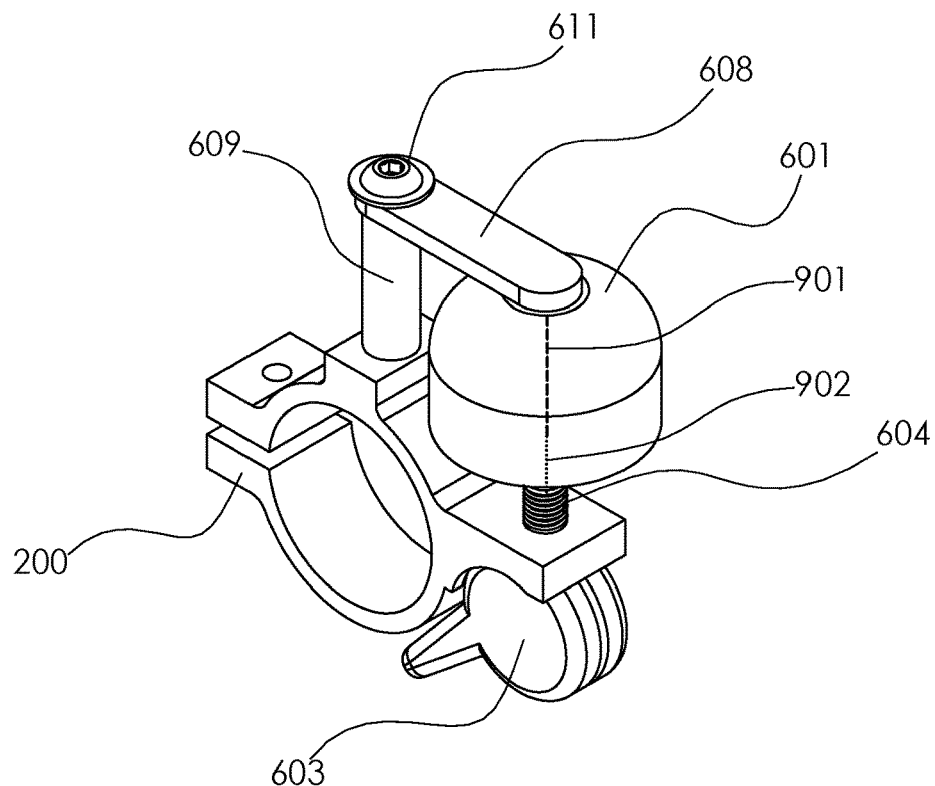
FIG. 22 illustrates a perspective view of the sound device shown in FIG. 20, showing the actuation device in the off state, having moved the striker away from the ringer such that the striker and ringer cannot contact one another.
Figure 23:
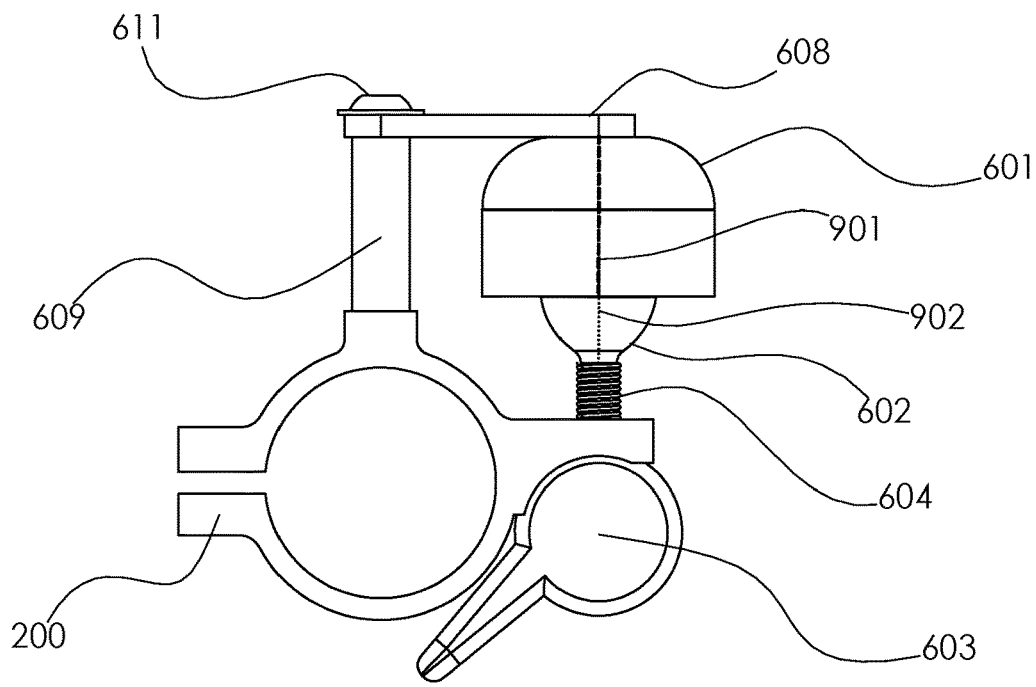
FIG. 23 illustrates a side view of the sound device shown in FIG. 20, showing the actuation device in the off state moving the striker away from the ringer such that they cannot contact each other.
Figure 24:
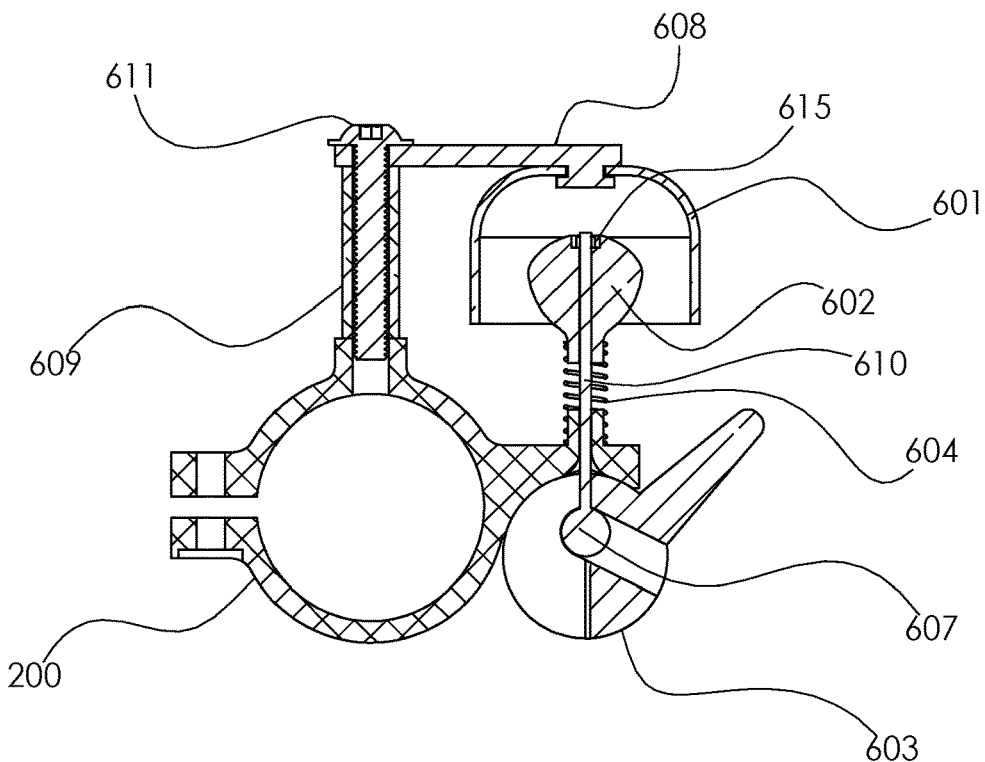
FIG. 24 illustrates the cross section of a side view of the sound device shown in FIG. 20, wherein the internal striker can be moved closer to the ringer so that it can contact the external ringer by manipulating the actuation device into the on state.
Figure 25:
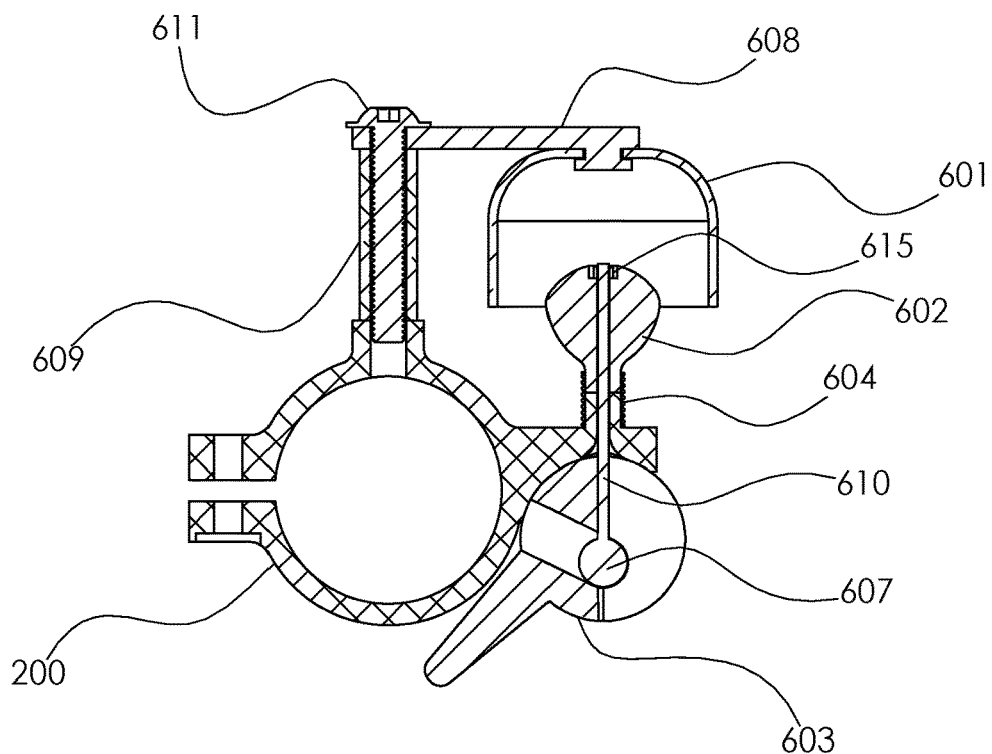
FIG. 25 illustrates the cross section of a side view of the sound device shown in FIG. 20, wherein the internal striker can be moved away from the ringer such that it is unable to contact the external ringer by manipulating the actuation device into the off state.
Figure 26:
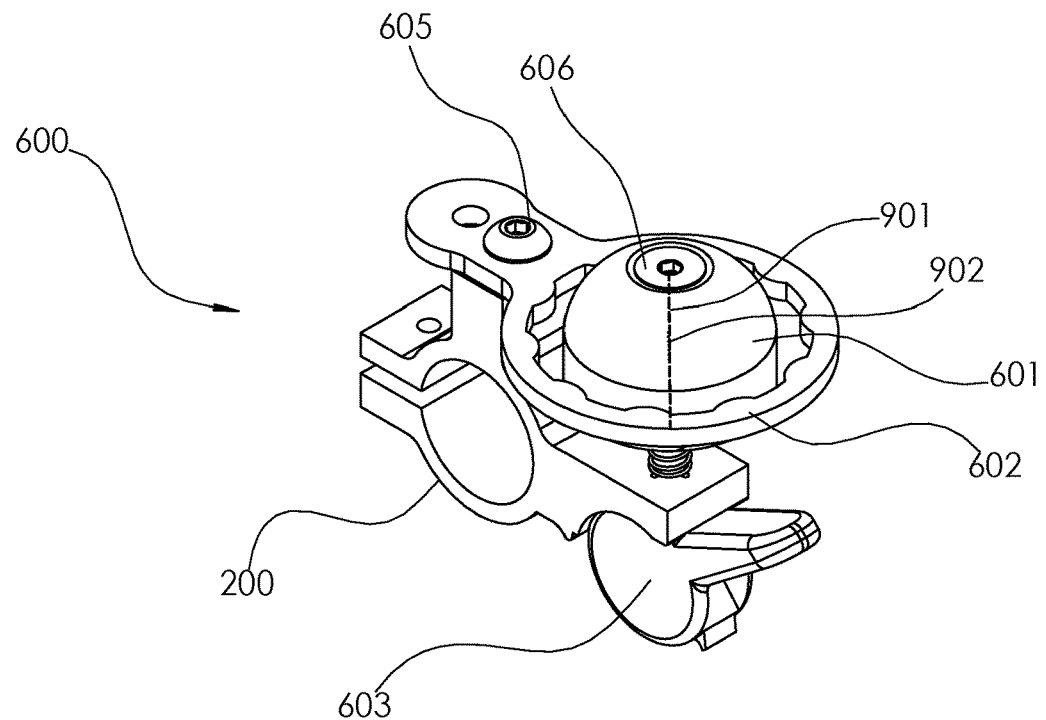
FIG. 26 illustrates a perspective view of an embodiment of the switchable mechanical motion activated sound device wherein the ringer can be coupled internally to an external striker and motion of the ringer can create sound when the actuation device is in the on state.
Figure 27:
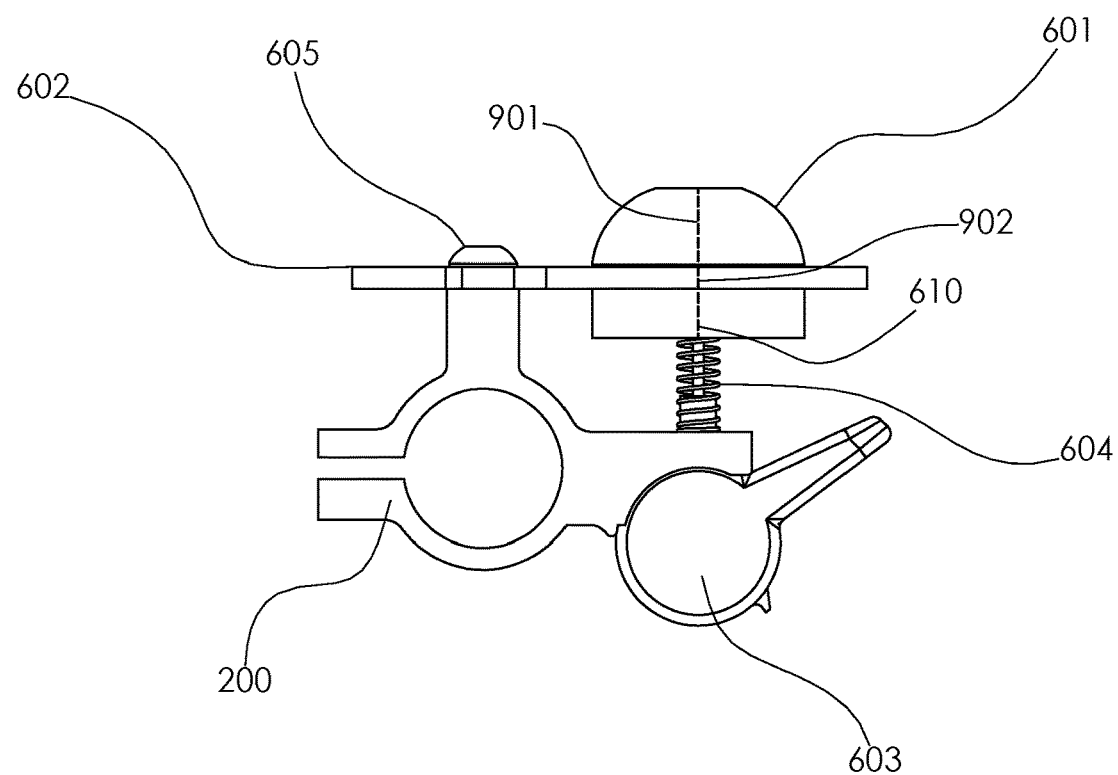
FIG. 27 illustrates a side view of the sound device shown in FIG. 26, showing the actuation device in the on state, having moved the internal ringer into a position such that the external striker can contact the ringer.
Figure 28:
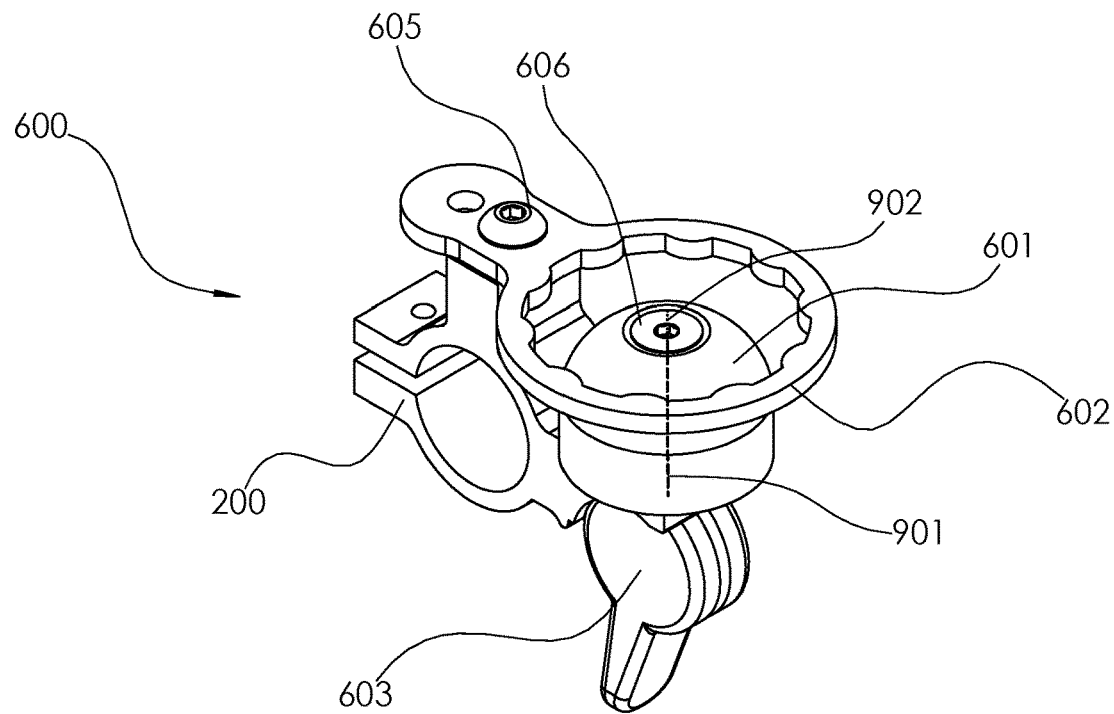
FIG. 28 illustrates a perspective view of the sound device shown in FIG. 27, showing the actuation device in the off state, having moved the internal ringer into a position wherein the external striker cannot contact the ringer.
Figure 29:
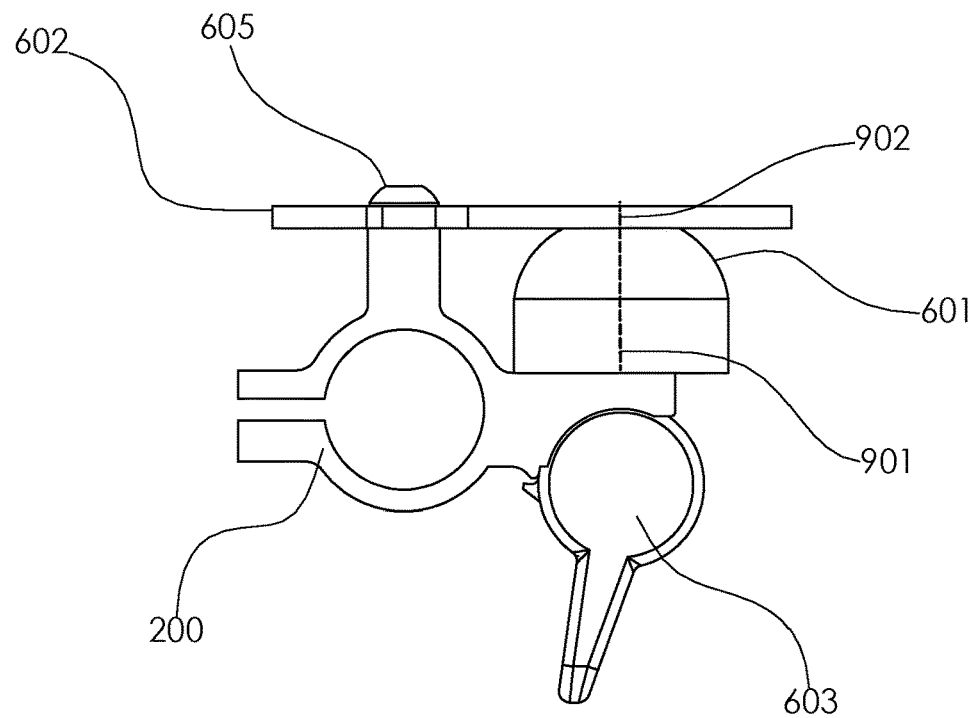
FIG. 29 illustrates a side view of the sound device shown in FIG. 26, showing the actuation device in the off state having moved the internal ringer into a position wherein the external striker cannot contact the ringer.

Referring to FIGS. 22-25, wherein like numerals indicate corresponding parts throughout the views, embodiments of the switchable mechanical motion activated sound device 600 are shown. An internal striker 602 can contact the inside surface of a ringer 601 while the actuation device 603 is in the on state, thereby emitting sound as the switchable mechanical motion activated sound device 600 is in motion. The internal striker 602 can be coupled to an actuation device 603 through a linkage connection 607, linkage component 610 and a spring 604. FIGS. 22, 23 and 25 illustrate the actuation device 603 preventing the internal striker 602 from contacting the ringer 601, in turn minimizing or eliminating the ringing sound. The striker 602 and ringer 601 can axially move apart, while still axially overlapping (FIG. 25), but being unable to contact each other when at rest.

Figure 20:
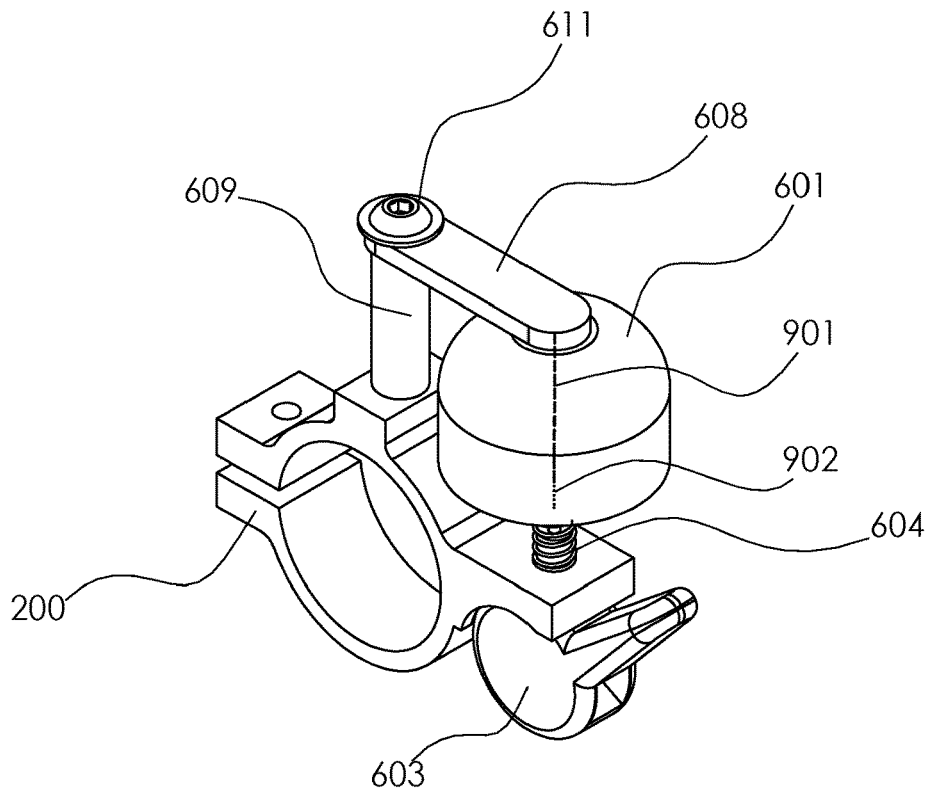
FIG. 20 illustrates a perspective view of an embodiment of the switchable mechanical motion activated sound device wherein the striker can be coupled internally to an external ringer and motion of the striker can create sound when the actuation device is in the on state.
Figure 21:
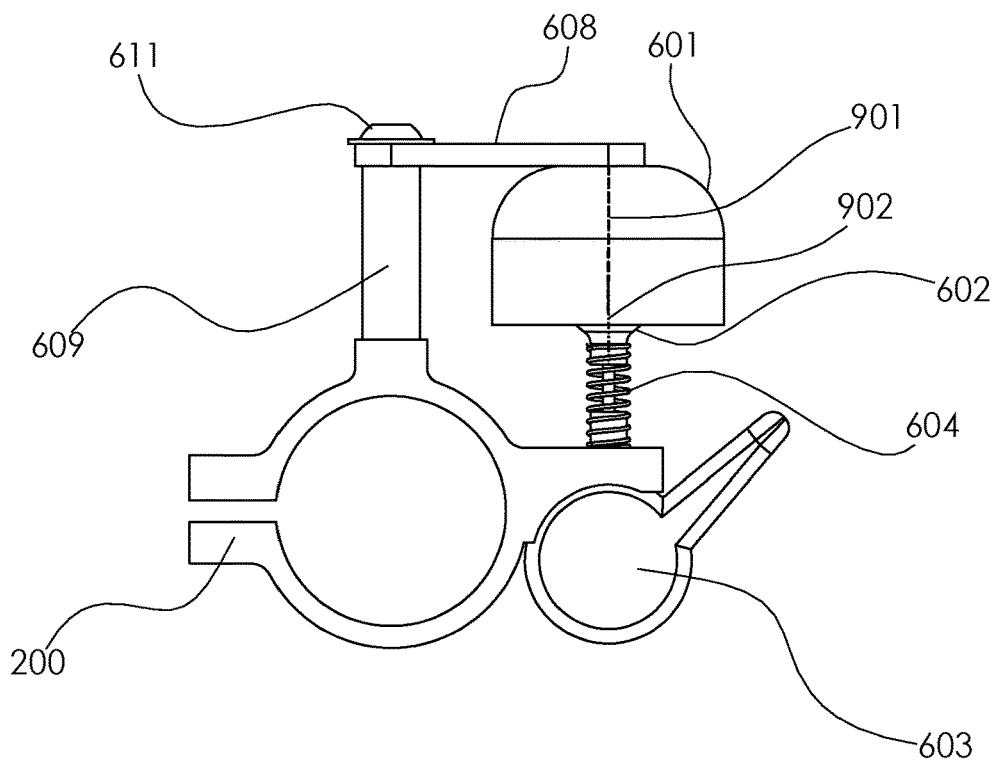
FIG. 21 illustrates a side view of the sound device shown in FIG. 20, showing the actuation device in the on state moving the striker into a position such that the striker and ringer can contact one another.

FIGS. 20, 21 and 24 illustrate the actuation device 603 in a position in which the external striker 602 can contact the ringer 601. Rotational movement of the actuation device 603 (counterclockwise, in FIG. 25) from the off state to the on state (FIG. 24) moves the internal striker 602 into closer proximity to the external ringer 601. In contrast, rotational movement of the actuation device 603 (clockwise, in FIG. 24) initiates increasingly restrictive motion of the internal striker 602, gradually dampening amplitude of motion and, thereby, reducing the sound emitted from the device 600. Full retraction of the striker 602 to the off state (FIG. 25) moves the striker 602 away from the ringer 601 such that little or no sound is emitted from the device 600.

The striker 602 and ringer 601 can axially move apart, while still axially overlapping (FIG. 29), but being unable to contact each other.

FIGS. 26-29 illustrate a third embodiment of the switchable mechanical motion activated sound device 600 wherein a ringer 601 with an axis 901 can be moved toward a stationary external striker 602 having an axis 902 to allow contact between the ringer 601 and the striker 602. The embodiment shown can consist of a bar mount 200, a ringer 601 coupled to an actuation device 603 with a ringer attachment component 606, a striker 602 coupled to the switchable mechanical motion activated sound device 600 with a striker attachment component 605, a spring 604, and a linkage component 610 linking the ringer 601 and actuation device 603. In the embodiment shown, the user can manipulate the actuation device 603 until the spring 604 is no longer compressed, or in the off state, and the ringer 601 is able to move into the on state position where it is free to contact the striker 602. Rotational movement of the actuation device 603 (counterclockwise, in FIG. 29) from the off state to the on state (FIG. 27) moves the internal ringer 601 into closer proximity to the external striker 602. In contrast, rotational movement of the actuation device 603 (clockwise, in FIG. 27) from the on state initiates increasingly restrictive motion of the ringer 601, gradually dampening amplitude of motion and, thereby, reducing the sound emitted from the device 600. Full retraction of the ringer 601 to the off state (FIG. 29) moves the ringer 601 away from the striker 602 such that little or no sound is emitted from the device 600.

FIGS. 30-35 illustrate a fourth embodiment of the switchable mechanical motion activated sound device 600, in accordance with some embodiments, wherein the ringer 601 can move away from a stationary internal striker 602. The embodiment is shown in an orientation with the internal striker 602 above the ringer 601, but it can be coupled to a plurality of objects in any orientation, in accordance with some embodiments. The switchable mechanical motion activated sound device 600 can be configured in a preferred orientation with the internal striker 602 below the ringer 601 and can be done without the use of a spring 604. A plurality of shapes and sizes can be used in place of the ringer 601, the internal striker 602, or the actuation device 603 shown. In the embodiment shown, the internal striker 602 is coupled to the bar mount 200 using a first 609, second 611, and third 608 member, though this can be accomplished with any number of members or the internal striker 602 can be an integral part of the attachment device.

Figure 30:
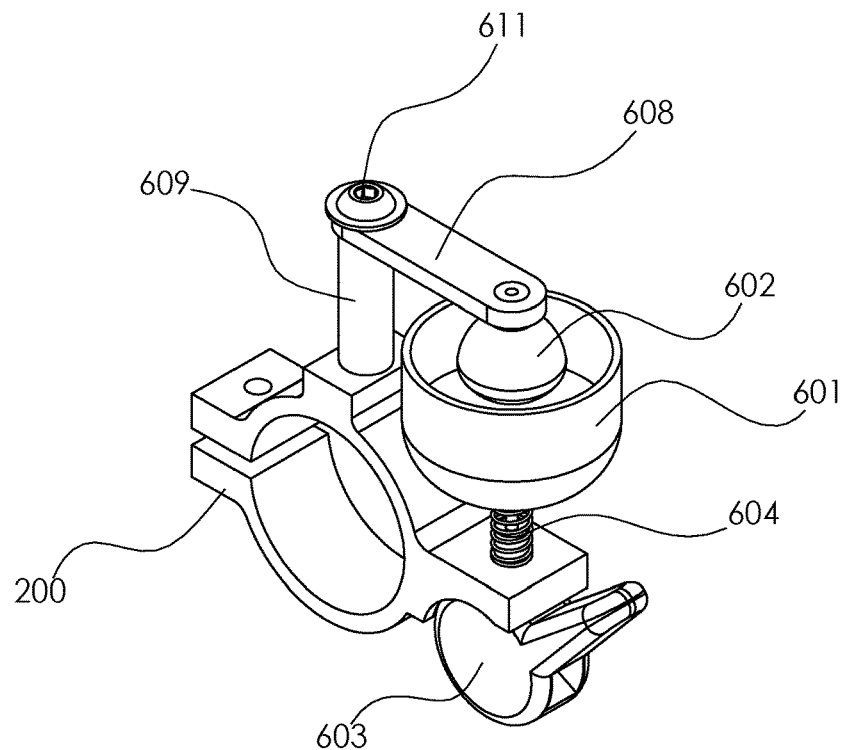
FIG. 30 illustrates a perspective view of an embodiment of the switchable mechanical motion activated sound device wherein the striker can be coupled internally to an external ringer and movement of the ringer can create sound when the actuation device is in the on state.
Figure 31:
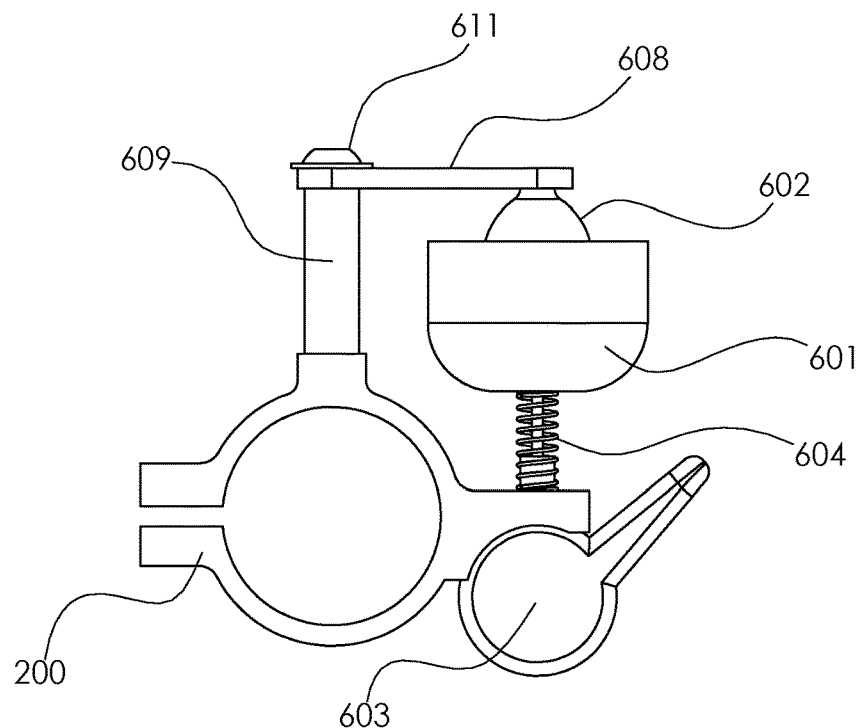
FIG. 31 illustrates a side view of the sound device shown in FIG. 30, showing the actuation device in the on state such that the internal striker can contact the ringer.
Figure 32:
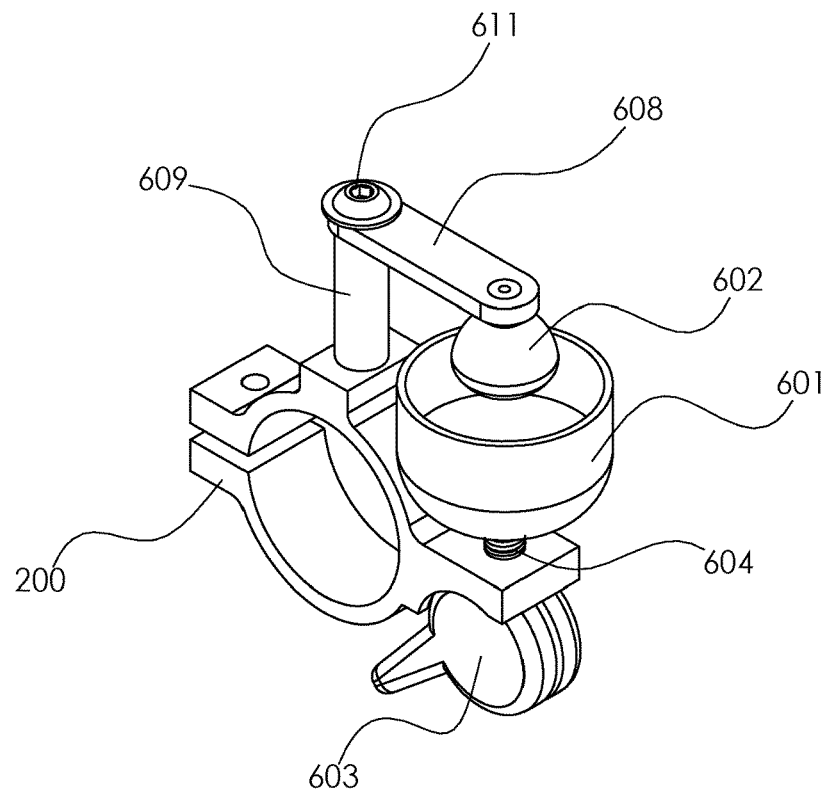
FIG. 32 illustrates a perspective view of the sound device shown in FIG. 30, showing the actuation device in the off state, having moved the external ringer into a position wherein the internal striker cannot contact the ringer.
Figure 33:
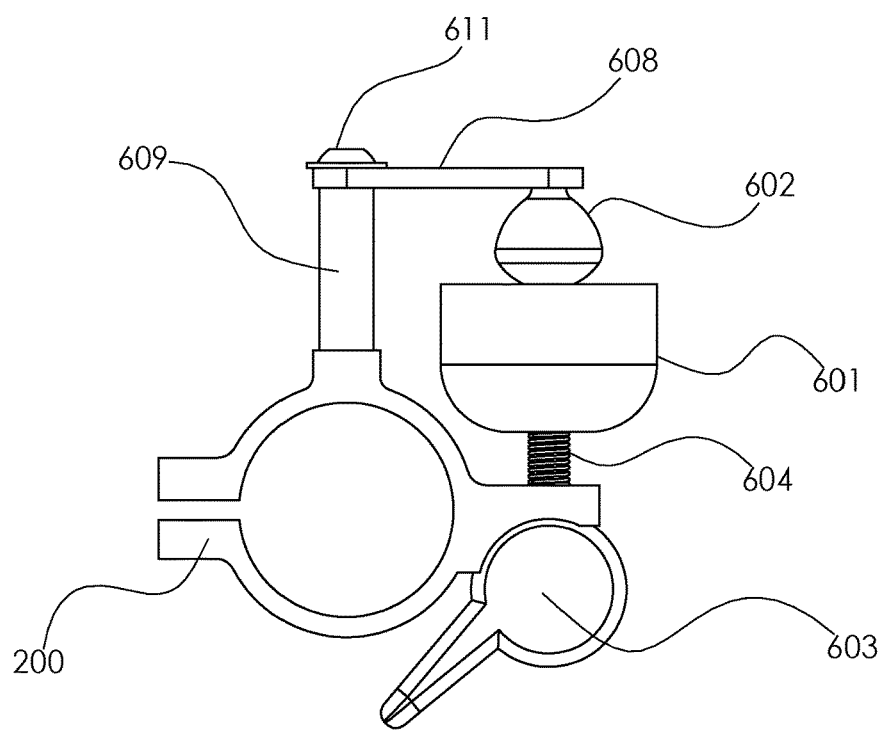
FIG. 33 illustrates a side view of the sound device shown in FIG. 30, showing the actuation device in the off state such that the internal striker cannot contact the ringer.
Figure 34:
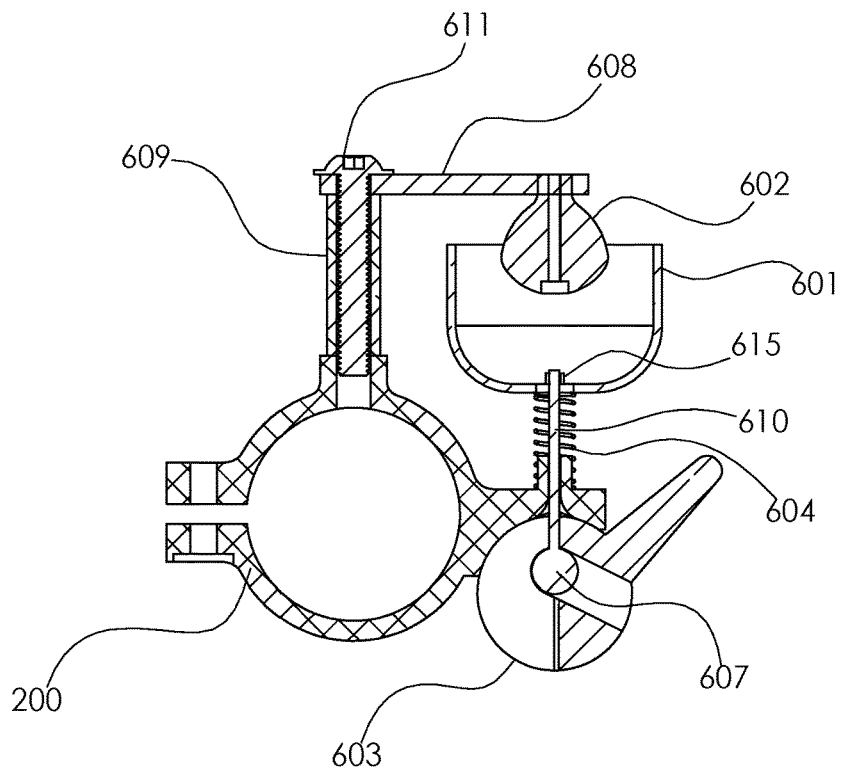
FIG. 34 illustrates a cross section of a side view of the sound device shown in FIG. 30, showing the actuation device in the on state, having moved the external ringer into a position wherein the internal striker can contact the ringer.

FIG. 34 illustrates a cross section of a side view of the sound device shown in FIG. 30, showing the actuation device 603 having moved the external ringer 601 into the on state position wherein the internal striker 602 can contact the ringer 601.

Figure 35:
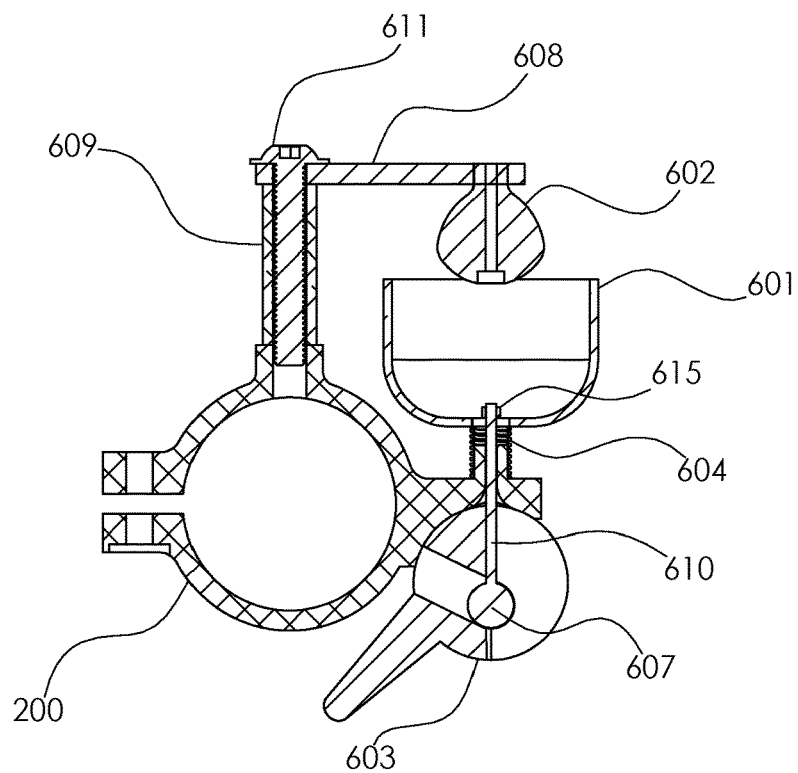
FIG. 35 illustrates a cross section of a side view of the sound device shown in FIG. 30, showing the actuation device in the off state, having moved the external ringer into a position wherein the internal striker cannot contact the ringer.
Figure 36:
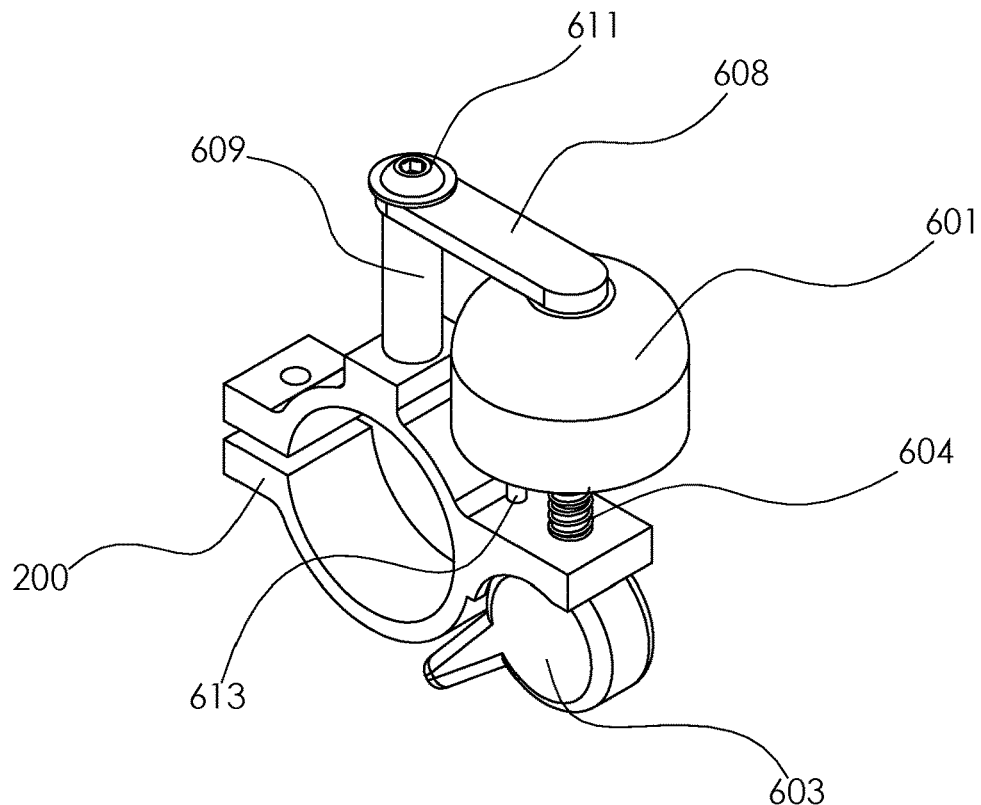
FIG. 36 illustrates a perspective view of an embodiment of the switchable mechanical motion activated sound device wherein an interference device such as a wedge can be moved into a position internal to the ringer and external to the striker to reduce or eliminate sound.
Figure 37:
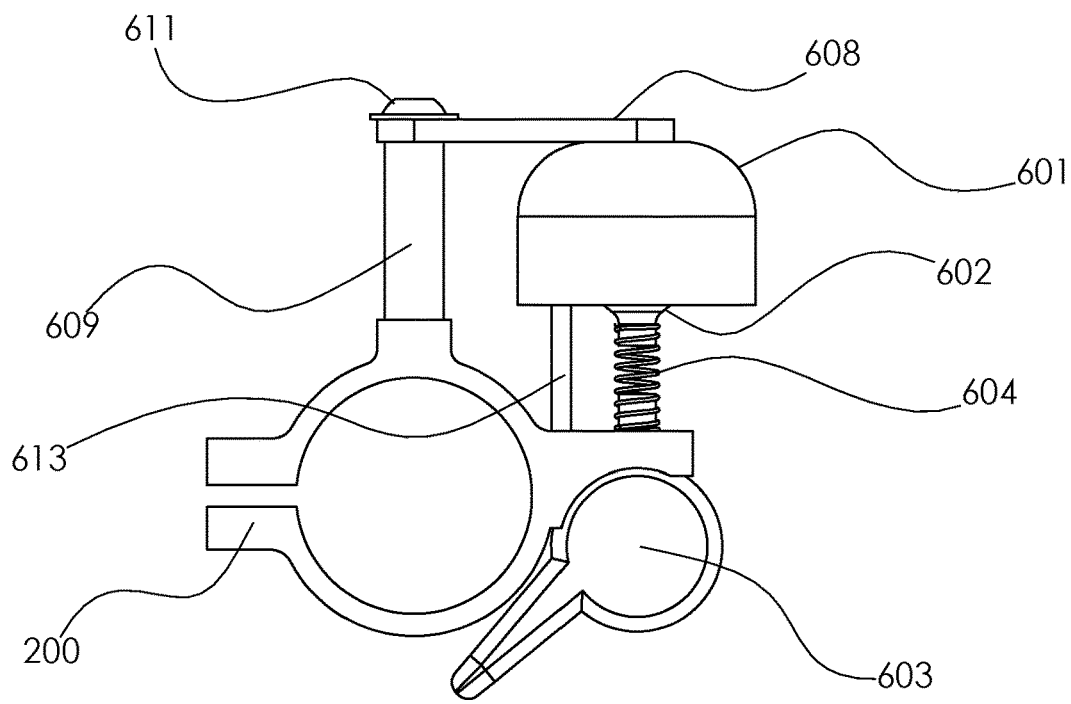
FIG. 37 illustrates a side view of the sound device shown in FIG. 36, showing the actuation device in the off state, having moved the internal wedge into a position wherein the striker cannot contact the external ringer.
Figure 38:
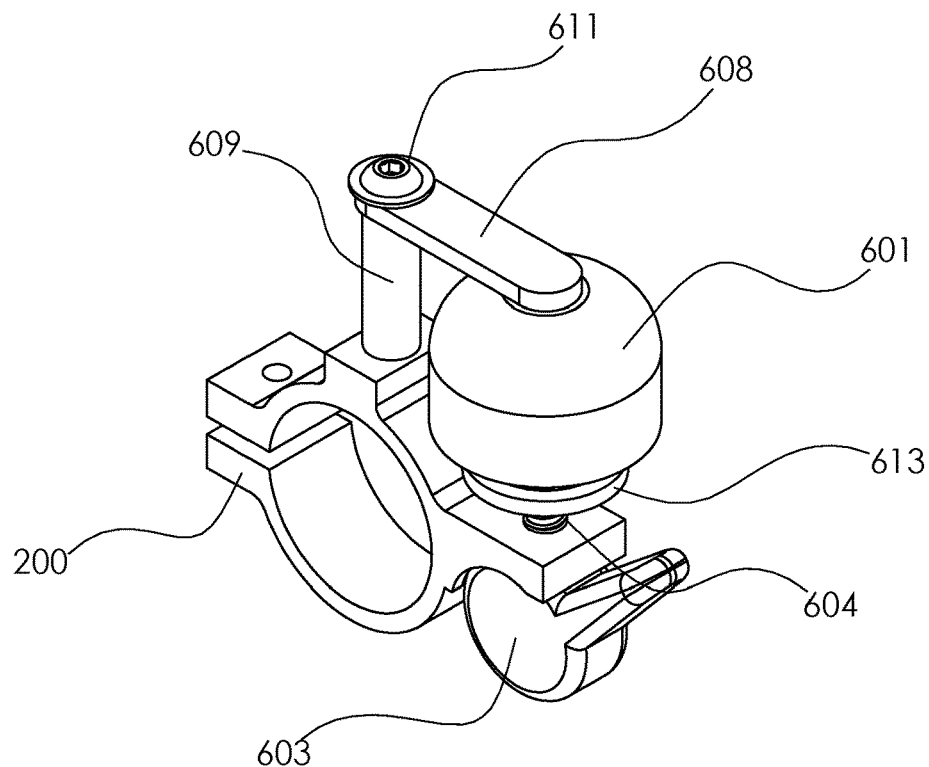
FIG. 38 illustrates a perspective view of the sound device shown in FIG. 36, showing the actuation device in the on state, having moved an internal wedge into a position wherein the striker can contact the external ringer.
Figure 39:
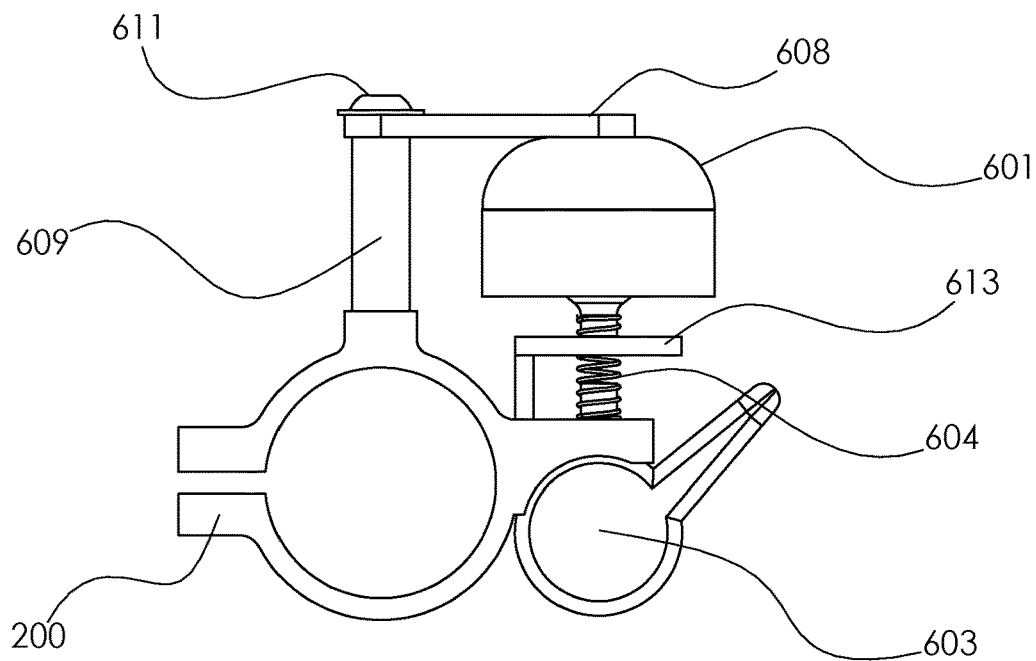
FIG. 39 illustrates a side view of the sound device shown in FIG. 36, showing the actuation device in the on state, with the internal wedge withdrawn into a position wherein the striker can contact the external ringer.

FIG. 35 illustrates a cross section of a side view of the sound device shown in FIG. 30, showing the actuation device 603 having moved the external ringer 601 into the off state position wherein the internal striker 602 cannot contact the ringer 601. Rotational movement of the actuation device 603 (counterclockwise, in FIG. 35) from the off state to the on state (FIG. 34) moves the external ringer 601 into closer proximity to the internal striker 602. In contrast, rotational movement of the actuation device 603 (clockwise, in FIG. 34) from the on state initiates increasingly restrictive motion of the internal ringer 601, gradually dampening amplitude of motion and, thereby, reducing the sound emitted from the device 600. Full retraction of the ringer 601 to the off state (FIG. 35) moves the ringer 601 away from the striker 601 such that little or no sound is emitted from the device 600.

FIGS. 36-41 illustrate a perspective view of an embodiment of the switchable mechanical motion activated sound device 600 wherein an interference device 613 such as a wedge or brace can be moved into a position internal to the ringer 601 and external to the striker 602 to reduce or eliminate sound, in accordance with some embodiments. The interference device 613 can be a plurality of shapes or sizes and can be used in a plurality of embodiments. It can be configured to function in a position where it is external to a ringer 601 and internal to a striker 602 or where it is in between an adjacent ringer 601 and striker 602. It can be configured to reduce the sound to varying degrees and can be configured to eliminate sound altogether.

Figure 40:
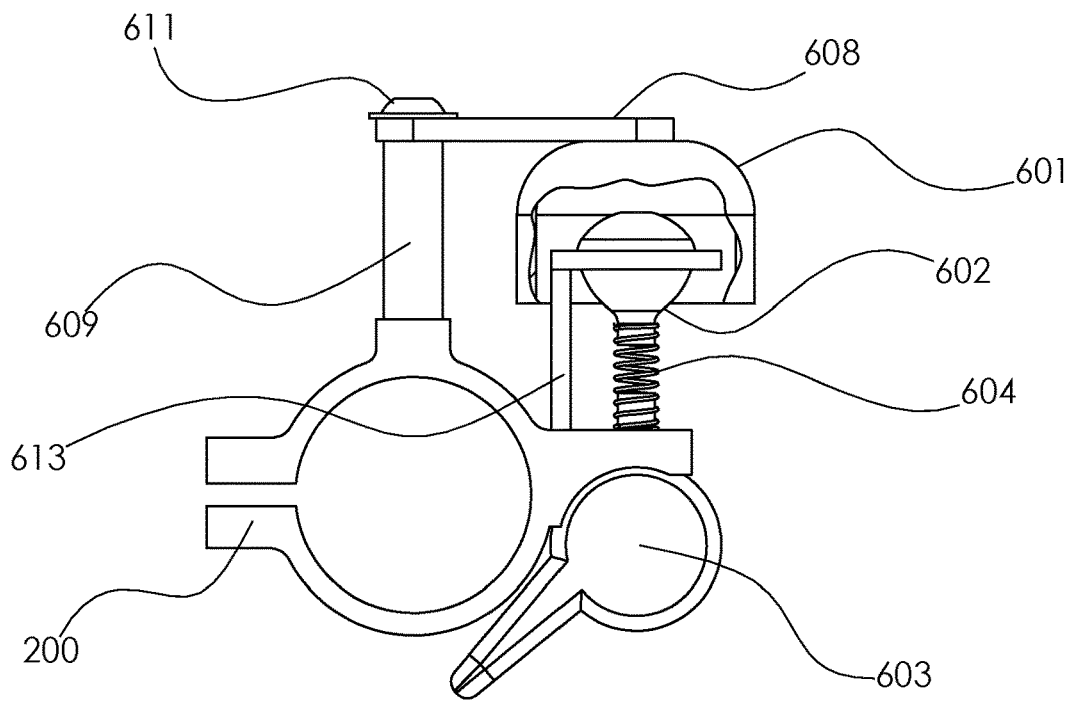
FIG. 40 illustrates a cut away view of the sound device shown in FIG. 36, showing the actuation device in the off state, having moved the internal wedge into a position wherein the striker cannot contact the external ringer.
Figure 41:
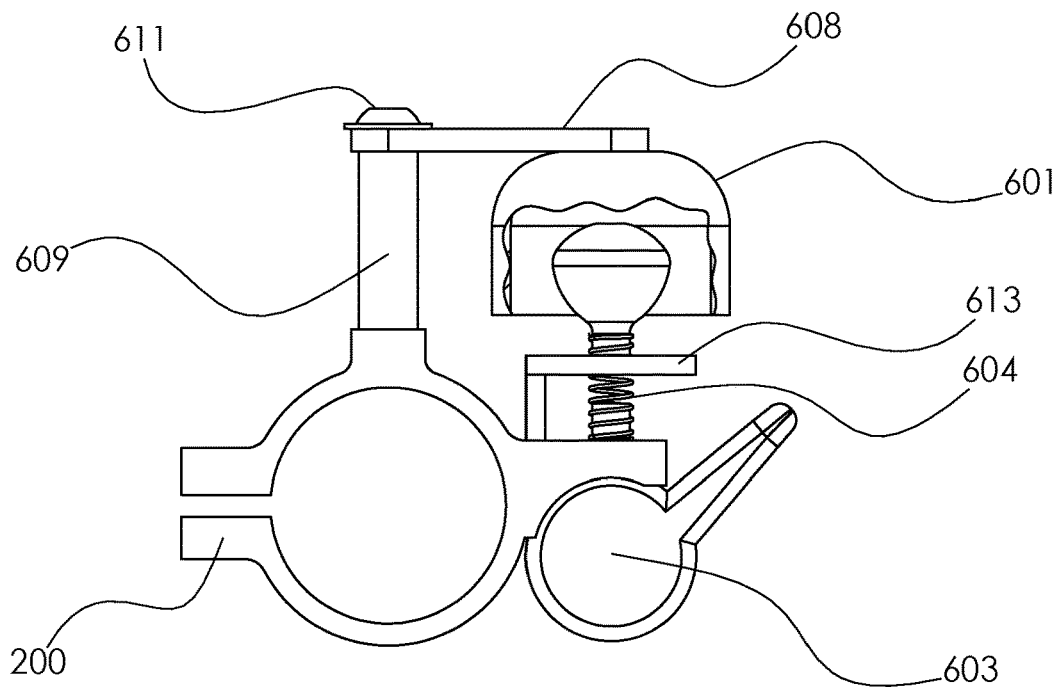
FIG. 41 illustrates a cut away view of the sound device shown in FIG. 36, showing the actuation device in the on state with the internal wedge withdrawn into a position wherein the striker can contact the external ringer.

FIGS. 40-41 illustrate the actuation device 603 in both the off state, where the interference device 613 is engaged, and the on state, where the interference device 613 is not engaged thereby either minimizing or maximizing sound emitted from the ringer 601 when contact with the striker 602 is made. Rotational movement of the actuation device 603 (counterclockwise, in FIG. 40) from the off state to the on state (FIG. 41) moves the interference device 613 away from interfering with contact between the external ringer 601 and the internal striker 602. In contrast, rotational movement of the actuation device 603 (clockwise, in FIG. 41) from the on state initiates increasingly restrictive motion of the internal striker 602, gradually dampening amplitude of motion and, thereby, reducing the sound emitted from the device 600. Full engagement of the interference device 613 to the off state (FIG. 41) moves the interference device 613 to interfere with contact between the external ringer 601 and the internal striker 602 such that little or no sound is emitted from the device 600.

Figure 42:
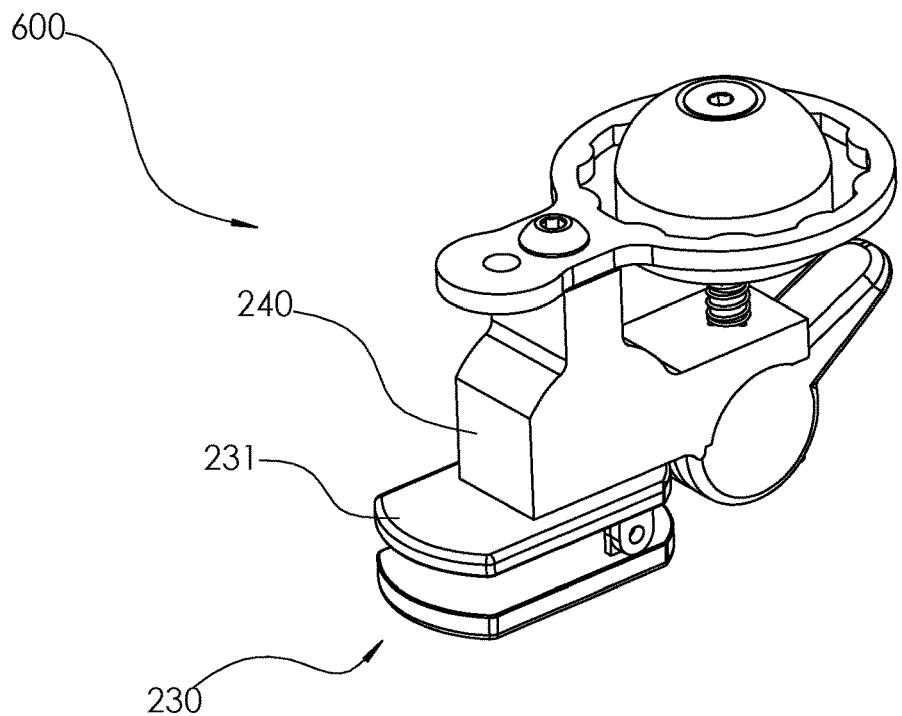
FIG. 42 illustrates a perspective view of an embodiment of the switchable mechanical motion activated sound device wherein a clip device can be coupled to a base member of the switchable mechanical motion activated sound device.

FIG. 42 illustrates a perspective view of an embodiment of the switchable mechanical motion activated sound device 600 (which can be any of the embodiments of device 600 disclosed herein) wherein a clip device 230 can be coupled to a base member 240 of the switchable mechanical motion activated sound device 600. In the embodiment shown, the base member 240 is above the clip device.

Figure 43:
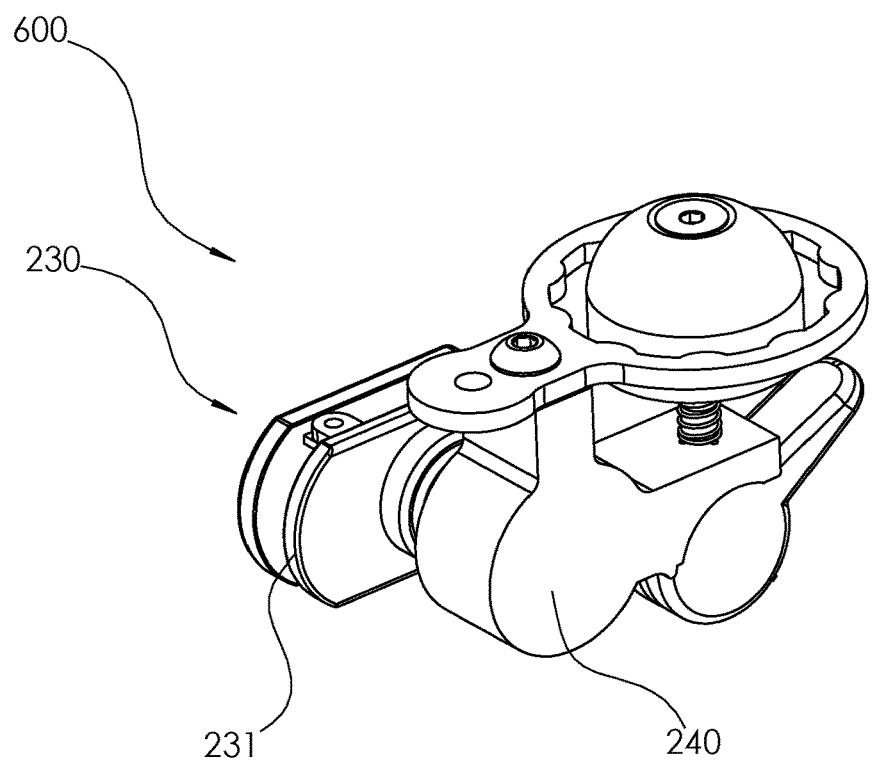
FIG. 43 illustrates a perspective view of the switchable mechanical motion activated sound device depicted in FIG. 42, wherein the attachment device can be coupled to a side of the sound device.

FIG. 43 illustrates a perspective view of the switchable mechanical motion activated sound device 600 (which can be any of the embodiments of device 600 disclosed herein) wherein the attachment device 230 can be coupled to a side of the sound device and can be coupled at the base member 240. In the embodiment shown, a clip device can couple the switchable mechanical motion activated sound device 600 to a thin object such as, but not limited to, a strap, a piece of fabric, or the shoelaces on a child's shoe.

Figure 44:
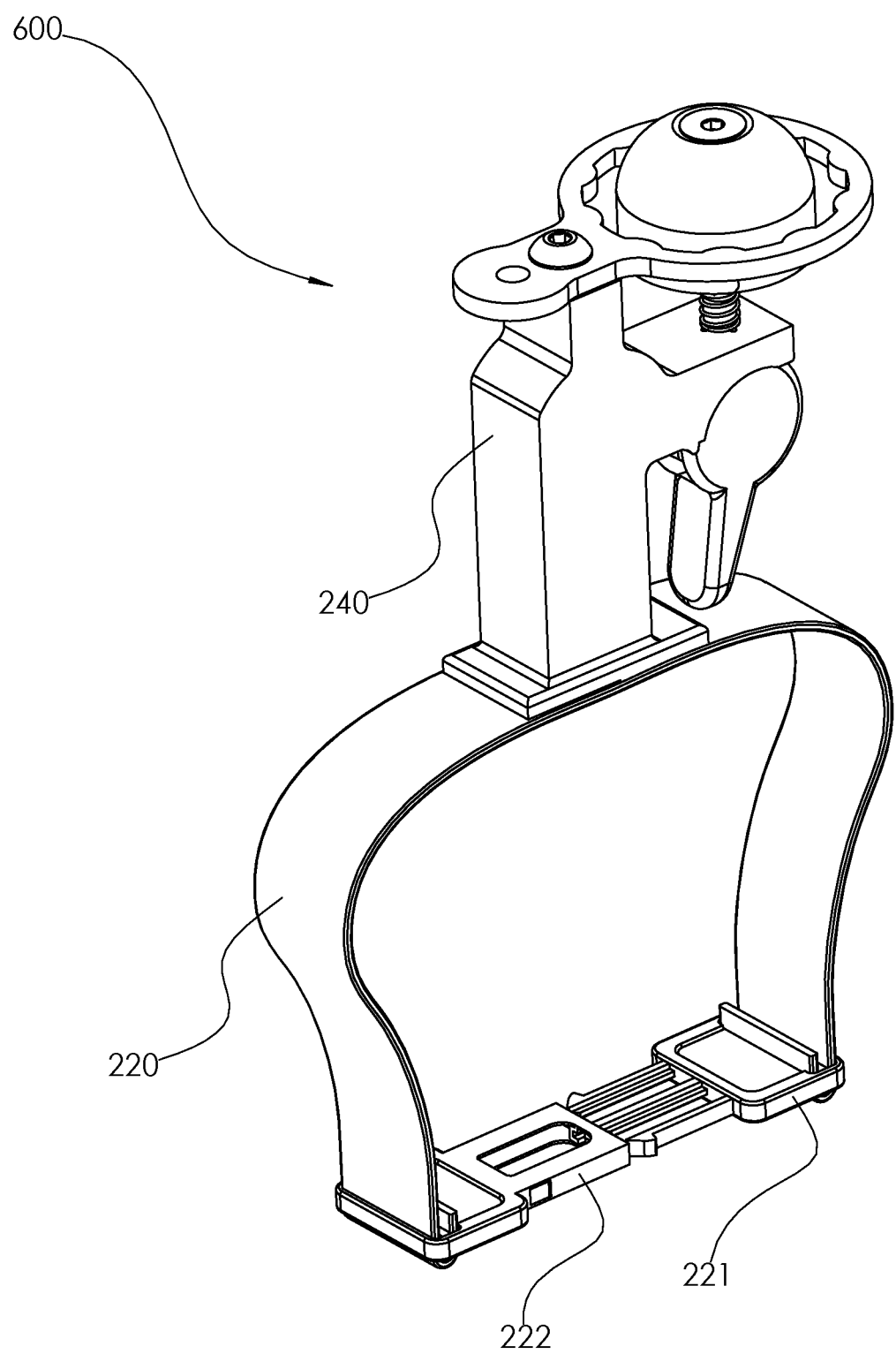
FIG. 44 illustrates a perspective view of the switchable mechanical motion activated sound device depicted in FIG. 26, wherein the attachment device at the bottom of the device can be coupled to a strap.

FIG. 44 illustrates a perspective view of the switchable mechanical motion activated sound device 600 (which can be any of the embodiments of device 600 disclosed herein) wherein the attachment device at the bottom of the device can be coupled to a strap 220. In the embodiment shown, the strap can be secured with a side release buckle 222, and 221. The sound device can be configured to couple to the strap in any orientation and the strap can use a plurality of other coupling devices.

Figure 45:
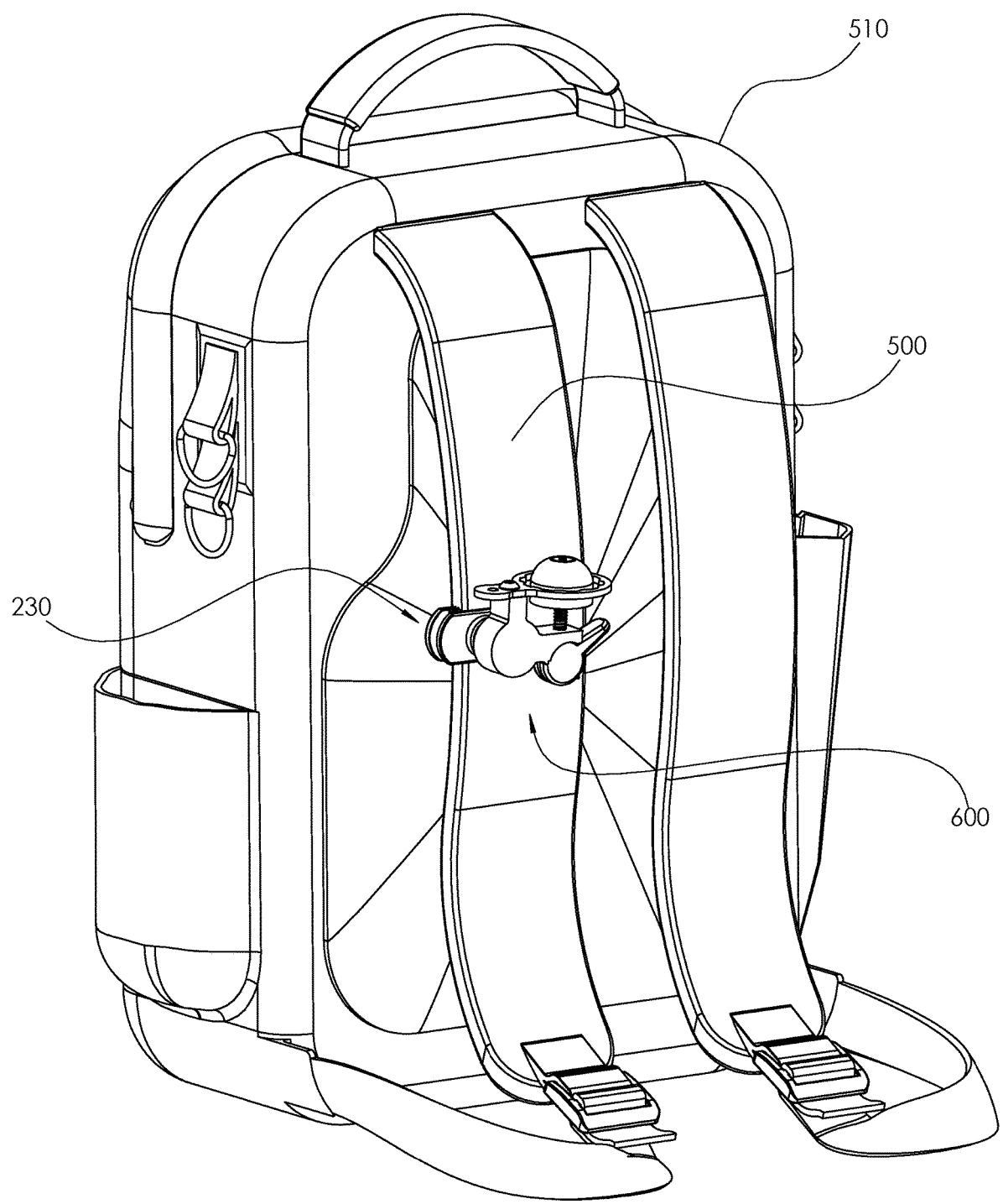
FIGS. 45-46 illustrate perspectives view of the switchable mechanical motion activated sound device, wherein the sound device can be coupled to other objects.

FIG. 45 illustrates a perspective view of the switchable mechanical motion activated sound device 600 (which can be any of the embodiments of device 600 disclosed herein) wherein the sound device can be coupled to a backpack 510. The embodiment shown can use a clip device 230 with the clip device coupled to the side of the base member 240 as shown in FIG. 43.

Figure 46:
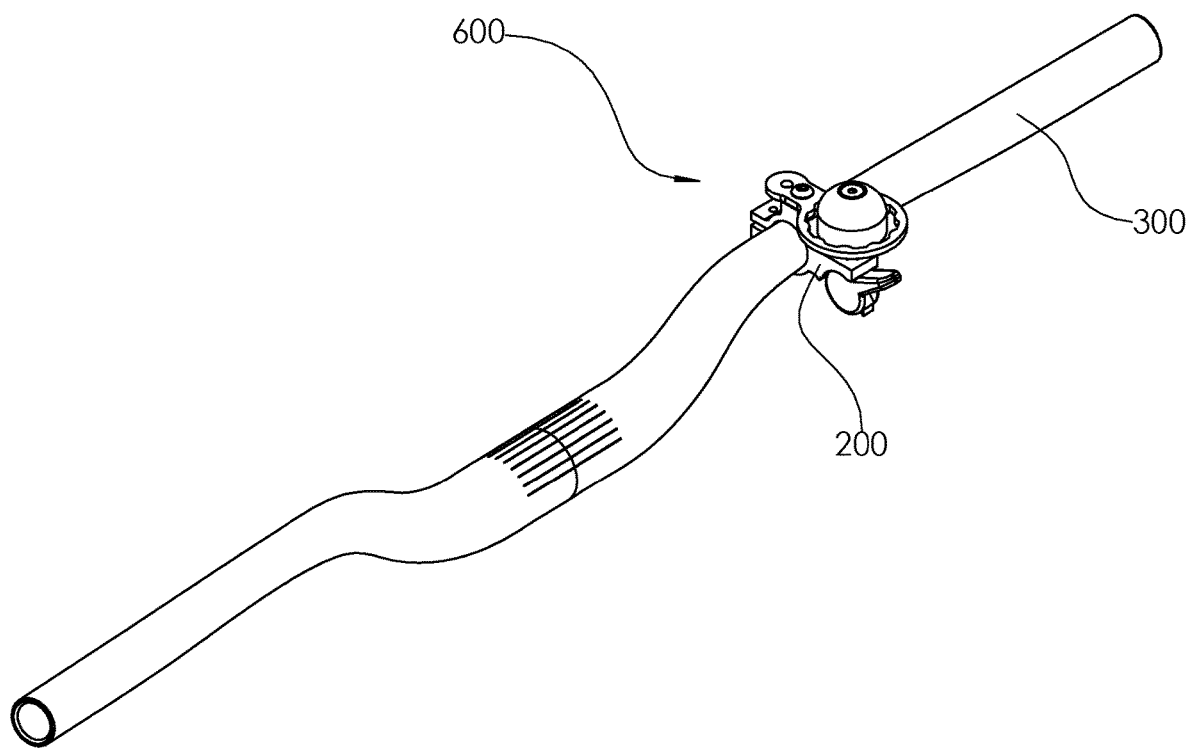

FIG. 46 illustrates a perspective view of the switchable mechanical motion activated sound device 600 (which can be any of the embodiments of device 600 disclosed herein) wherein the sound device can be coupled to a handlebar 300. The embodiment shown can use a bar mount 200.

One purpose of these embodiments is to mitigate the severity of interaction with an audible alert before the cyclist is visible to a pedestrian, wildlife, other cyclist, or other trail user. The device can be easily switched off when audible alerts are not desired. A user carrying this device can reduce the risk of being charged or attacked by wildlife. Embodiments of the device also can be used on pets or children to audibly track their location, but can be easily switched off when the motion-activated sound is not desired.

Other embodiments can include one or more of the following options.

1. An electrically powered sound emitting device comprising;
   a device which emits sound;
   a sensor capable of detecting movement of the device;
   an electrically powered circuit which, when the sensor is activated, sends a signal to the device to cause the device to emit sound; and
   an attachment device configured to couple the device to a person, animal, bicycle, other device, or some combination thereof.

2. The sound emitting device wherein the sound emitted is from a digital file stored on the device or accessed by the device via a network.

3. The sound emitting device wherein the threshold of movement, above which the device emits sound, is configurable.

4. The sound emitting device wherein a volume of the sound emitted is adjustable.

5. The sound emitting device wherein an interval between emissions of the sound or sequence of sounds is adjustable.

6. The sound emitting device further comprising a processing device communicatively coupled to the sensor and the electronically powered circuit.

7. The sound emitting device wherein the processing device is configured to determine whether a threshold level of movement is detected by the sensor.

8. A computer-implemented method comprising:
receiving, from a sensor included in a device, a first signal indicating movement of the device, wherein the device is configured to emit sound;
determining, based on the first signal, whether the movement of the device is above a threshold movement level; and
in response to determining the movement of the device is above the threshold movement level, transmitting a second signal to cause the device to emit the sound.

9. The computer-implemented method wherein the second signal is transmitted to a speaker included in the device.

10. The computer-implemented method further comprising modifying an attribute of the sound based on determining the movement of the device is below the threshold movement level, wherein the attribute comprises a volume, a tone, a frequency, a melody, or some combination thereof.

11. The computer-implemented method wherein the determining whether the movement of the device is above the threshold movement level comprises measuring an amount of acceleration experienced by the sensor, 12. The computer-implemented method further comprising transmitting a control signal to a computing device external to the device, wherein the control signal causes the computing device to emit the sound, 13. The computer-implemented method further comprising:
determining a distance between the device and a computing device external to the device; and
based on the distance, causing the computing device to emit the sound.

14. The computer-implemented method further comprising controlling an interval between the sound being emitted.

15. A tangible, non-transitory computer-readable medium storing instructions that when executed, cause a processing device to:
receive, from a sensor included in a device, a first signal indicating movement of the device, wherein the device is configured to emit sound;
determine, based on the first signal, whether the movement of the device is above a threshold movement level; and
in response to determining the movement of the device is above the threshold movement level, transmit a second signal to cause the device to emit the sound.

16. The computer-readable medium wherein the second signal is transmitted to a speaker included in the device.

17. The computer-readable medium wherein the processing device is configured to modify an attribute of the sound based on determining the movement of the device is below the threshold movement level, wherein the attribute comprises a volume, a tone, a frequency, a melody, or some combination thereof.

18. The computer-readable medium wherein the determining whether the movement of the device is above the threshold movement level comprises measuring an amount of acceleration experienced by the sensor.

19. The computer-readably: medium wherein the processing device is configured to transmit a control signal to a computing device external to the device, wherein the control signal causes the computing device to emit the sound.

20. The computer-readable medium wherein the processing device is configured to:
determine a distance between the device and a computing device external to the device; and based on the distance, cause the computing device to emit the sound.

Still other embodiments can include one or more of the following options.

1. A device for selectively emitting sound produced by mechanical contact, the device comprising:
a mount configured to couple the device to an object;
a ringer coupled to the mount;
a striker coupled to the mount;
an actuator coupled to the mount and to one of the ringer and the striker, the actuator has an on position wherein the ringer and striker are free to make mechanical contact and configured to emit sound when the device is in motion, and the actuator has an off position wherein the actuator does one of the following:
positions the striker away from the ringer to prevent or reduce contact and mechanical sound made by contact between the ringer and striker; or
positions the ringer away from the striker to prevent or reduce contact and mechanical sound made by contact between the ringer and striker.

2. The device wherein at least a portion of the ringer is circular in shape, and the ringer is configured to be variably damped to selective reduce sound between the on and off positions.

3. The device wherein the ringer comprises a bar.

4. The device wherein the ringer comprises a bell and, in the off position, one of the ringer and striker is not immobilized or stationary.

5. The device wherein the ringer comprises a fork-like shape.

6. The device wherein the striker comprises a clapper.

7. The device wherein at least a portion of the striker is circular in shape.

8. The device wherein the striker is external relative to the ringer.

9. The device wherein the striker is internal relative to the ringer.

10. The device wherein the striker is adjacently coupled to the ringer, the striker and ringer are co-axial relative to an axis and, in the off position, there is no axial overlap between the striker and ringer.

11. The device wherein the striker comprises a plurality of strikers, or the ringer comprises a plurality of ringers.

12. The device wherein at least one of the strikers can be manually operated to strike the ringer independent of whether the device is in motion.

13. The device wherein at least one of the ringers can be manually operated to strike the striker independent of whether the device is in motion.

14. A device for selectively emitting sound made by mechanical contact, the device comprising:
a mount configured to couple the sound device to an object;
a ringer coupled to the mount;
a striker coupled to the mount;
a blocker coupled to the mount;
an actuator coupled to the mount and to the blocker, the actuator has an on position wherein the blocker is configured to not impede mechanical contact between the ringer and striker to make sound when the device is in motion, and the actuator has an off position wherein the blocker is configured to impede mechanical contact between the ringer and striker to prevent sound when the device is in motion.

15. The device wherein at least a portion of the ringer is circular in shape, and the ringer is configured to be variably damped to selective reduce sound between the on and off positions.

16. The device wherein the ringer comprises a bar.

17. The device wherein the ringer comprises a bell and, in the off position, one of the ringer and striker is not immobilized or stationary.

18. The device wherein the ringer comprises a fork-like shape.

19. The device wherein the striker comprises a clapper.

20. The device wherein at least a portion of the striker is circular in shape.

21. The device wherein the striker is external relative to the ringer.

22. The device wherein the striker is internal relative to the ringer.

23. The device wherein the striker is adjacently coupled to the ringer, the striker and ringer are co-axial relative to an axis and, in the off position, there is no axial overlap between the striker and ringer.

24. The device wherein the striker comprises a plurality of strikers, or the ringer comprises a plurality of ringers.

25. The device wherein at least one of the strikers can be manually operated to strike the ringer independent of whether the device is in motion.

26. The device wherein at least one of the ringers can be manually operated to strike the striker independent of whether the device is in motion.

Alternatively, any or all aspects of the electronic and mechanical devices disclosed herein can be combined into embodiments of a single, integrated device that can selective provide both electronic sound and/or mechanical sound.

The foregoing description, for purposes of explanation, used specific nomenclature to provide a thorough understanding of the embodiments. However, it will be apparent to one skilled in the art that the specific details are not required to practice the embodiments. Thus, the foregoing descriptions of the specific embodiments described herein are presented for purposes of illustration and description. They are not targeted to be exhaustive or to limit the embodiments to the precise forms disclosed. It will be apparent to one of ordinary skill in the art that many modifications and variations are possible in view of the above teachings.

What is claimed is:

1. An electrically powered sound emitting system comprising;
    a portable device which emits sound;
    an inertial sensor in the device, wherein the inertial sensor generates acceleration data of the device;
    an electrically powered circuit operatively coupled to the inertial sensor, non-volatile memory, wherein, when the inertial sensor is activated, the electrically powered circuit sends a signal to the device to cause the device to emit sound; and
    an attachment device configured to couple the device to a backpack, article of clothing, person, animal, bicycle or some combination thereof, wherein the non-volatile memory stores instructions that cause the electrically powered circuit to:
        compare the acceleration data to an acceleration magnitude threshold stored in the non-volatile memory, and
        when the acceleration data equals or exceeds the acceleration magnitude threshold, retrieve a digital audio file and drive the electrically powered circuit to reproduce the digital audio file at defined intervals ranging from continuous to infrequent.

2. The electrically powered sound emitting system of claim 1, wherein the digital audio file is accessed by the device via a network.

3. The electrically powered sound emitting system of claim 1, wherein the acceleration magnitude threshold is configurable.

4. A tangible, non-transitory computer-readable medium storing instructions that when executed, cause a processing system to:
    receive, from an inertial sensor included in a portable device, a first signal indicating movement of the device, wherein the device is configured to emit sound;
    receive, from the inertial sensor, acceleration data;
    compare the acceleration data to an acceleration magnitude threshold stored in a non-volatile memory of the device; and
    when the acceleration data equals or exceeds the acceleration magnitude threshold, retrieve a digital audio file and drive the electrically powered circuit to reproduce the digital audio file at defined intervals ranging from continuous to infrequent.

5. The electrically powered sound emitting system of claim 1, wherein the inertial sensor is a tri-axial micro electromechanical system (MEMS) sensor capable of sensing acceleration below 0.05 g.

6. The electrically powered sound emitting system of claim 1, wherein the acceleration magnitude threshold is received from a software application executing on a computing device.

7. The electrically powered sound emitting system of claim 1, further comprising:
    an actuator coupled to the attachment device, wherein the actuator has an on position and an off position.

8. The electrically powered sound emitting system of claim 1, wherein the digital audio file includes an adjustable interval, volume, tone, timbre, rhythm, frequency, and pitch.

9. The electrically powered sound emitting system of claim 8, wherein the digital audio file selects the adjustable interval, volume, tone, timbre, rhythm, frequency, or pitch based on a usage scenario.

10. The electrically powered sound emitting system of claim 8, wherein the digital audio file selects the adjustable interval, volume, tone, timbre, rhythm, frequency, or pitch based on an environmental condition.

11. The electrically powered sound emitting system of claim 1, further comprising:
    a housing including a clip or strap adjustable to secure the electrically powered sound emitting device to a handlebar, frame tube, backpack strap, or belt.

12. The electrically powered sound emitting system of claim 1, wherein the digital audio file is updatable via at least one of (i) a wired data connector or (ii) a short-range wireless link.

13. A computer-implemented method comprising:
    receiving, from an inertial sensor included in a system, a first signal indicating movement of the device, wherein the device is configured to emit sound;
    generating, by the inertial sensor, acceleration data;
    comparing the acceleration data to an acceleration magnitude threshold stored in a non-volatile memory of the device; and
    when the acceleration data equals or exceeds the acceleration magnitude threshold, retrieving a digital audio file and driving the electrically powered circuit to reproduce the digital audio file at defined intervals ranging from continuous to infrequent.

14. The computer-implemented method of claim 13, further comprising:
modifying an attribute of the digital audio file based on determining the acceleration data is below the acceleration magnitude threshold, wherein the attribute comprises a volume, a tone, a frequency, a melody, or some combination thereof.

15. The computer-implemented method of claim 13, further comprising:
determining a distance between the device and a computing device external to the device; and
based on the distance, causing the computing device to emit the sound.

16. The computer-implemented method of claim 13, further comprising:
controlling the determined intervals for reproducing the digital audio file.

17. The computer-readable medium of claim 4, wherein the processing system is configured to modify an attribute of the digital audio file based on determining the acceleration data is below the acceleration magnitude threshold, wherein the attribute comprises a volume, a tone, a frequency, a melody, or some combination thereof.

18. The computer-readable medium of claim 17, wherein the processing system is configured to:
determine a distance between the device and a computing device external to the device; and
based on the distance, cause the computing device to emit the sound.

\* \* \* \* \*